United States Patent
Ezawa

(10) Patent No.: US 7,453,489 B2
(45) Date of Patent: Nov. 18, 2008

(54) IMAGE PROCESSING APPARATUS, IMAGE PICKUP SYSTEM, IMAGE DISPLAY SYSTEM, IMAGE PICKUP DISPLAY SYSTEM, IMAGE PROCESSING PROGRAM, AND COMPUTER-READABLE RECORDING MEDIUM IN WHICH IMAGE PROCESSING PROGRAM IS RECORDED

(75) Inventor: Masayuki Ezawa, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 860 days.

(21) Appl. No.: 10/772,334

(22) Filed: Feb. 6, 2004

(65) Prior Publication Data

US 2004/0189795 A1    Sep. 30, 2004

(30) Foreign Application Priority Data

Mar. 24, 2003  (JP) ............................. 2003-081444

(51) Int. Cl.
*H04N 13/04* (2006.01)
*G06K 9/00* (2006.01)

(52) U.S. Cl. ........................................ 348/51; 382/154

(58) Field of Classification Search .................. 348/51, 348/59, 42, 55, 54, 47; 359/464; 385/16; 382/113, 154; 396/20
See application file for complete search history.

(56) References Cited

U.S. PATENT DOCUMENTS 5,937,212 A * 8/1999 Kurahashi et al. ............ 396/20
6,392,690 B1 * 5/2002 Fujii et al. .................... 348/59
6,549,650 B1 * 4/2003 Ishikawa et al. ............. 382/154
6,950,535 B2 * 9/2005 Sibayama et al. ........... 382/113
2003/0011884 A1 * 1/2003 Van Berkel .................. 359/464
2004/0240777 A1 * 12/2004 Woodgate et al. ............. 385/16

FOREIGN PATENT DOCUMENTS

| EP | 0 830 034 A1 | 3/1998 |
| EP | 0 953 962 A2 | 11/1999 |
| JP | 1-317091 A | 12/1989 |
| JP | 9-73049 A | 3/1997 |
| JP | 9-271042 A | 10/1997 |
| JP | 2002-359838 A | 12/2002 |

* cited by examiner

*Primary Examiner*—Gims S Philippe
(74) *Attorney, Agent, or Firm*—Birch, Stewart, Kolasch & Birch, LLP

(57) ABSTRACT

An image processing apparatus of the present invention is provided with (a) reduction calculation sections for reducing the number of a plurality of input image data, corresponding to a plurality of images that satisfy azimuth difference relations each other, in a lateral direction, (b) a three-dimensional processing section for combining the image data that have been reduced the number by the reduction calculation sections so as to prepare a three-dimensional image data; and (c) a display switching control section for switching and selecting which one of three-dimensional image data prepared by the three-dimensional processing section and two-dimensional image data prepared by using one of the plurality of input image data should be outputted from the image processing apparatus.

17 Claims, 21 Drawing Sheets

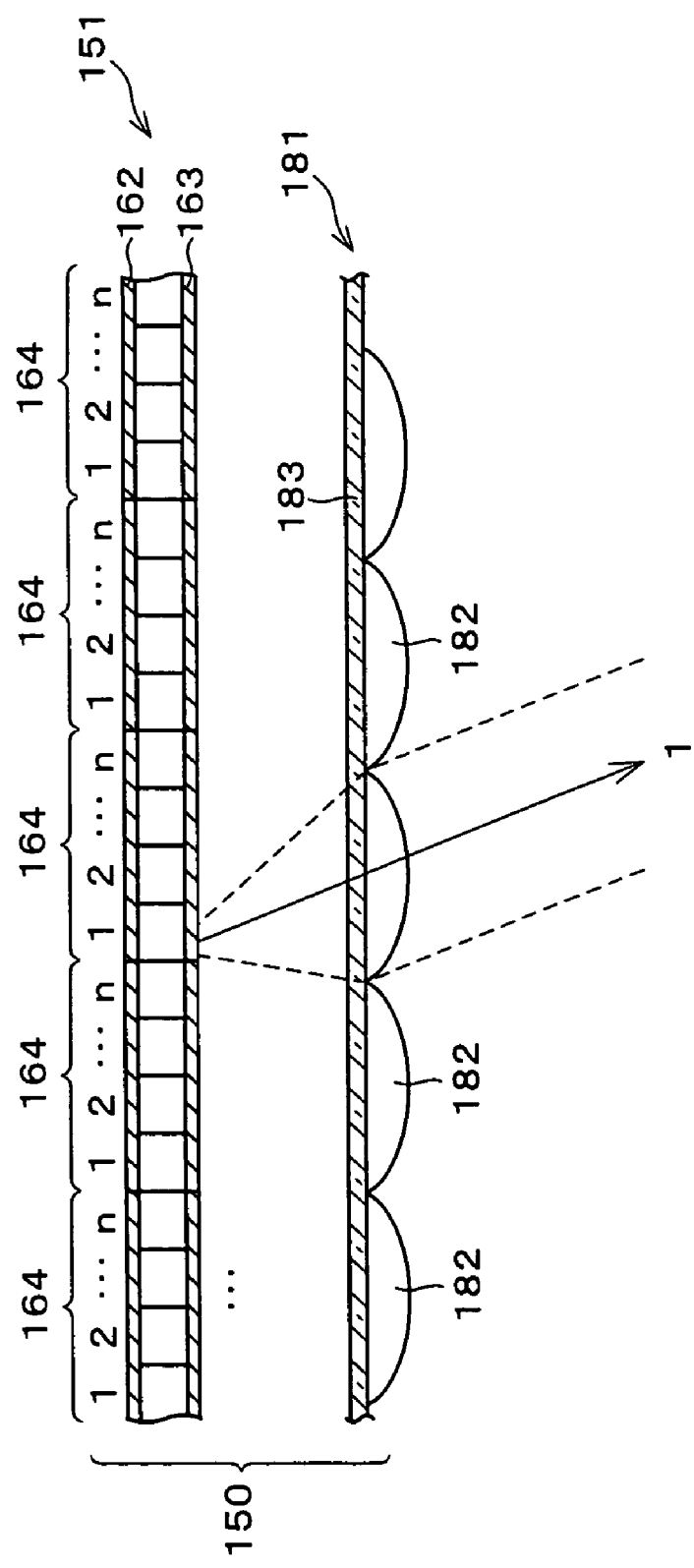

IMAGE PROCESSING APPARATUS, IMAGE PICKUP SYSTEM, IMAGE DISPLAY SYSTEM, IMAGE PICKUP DISPLAY SYSTEM, IMAGE PROCESSING PROGRAM, AND COMPUTER-READABLE RECORDING MEDIUM IN WHICH IMAGE PROCESSING PROGRAM IS RECORDED

This Nonprovisional application claims priority under 35 U.S.C. § 119(a) on Patent Application No. 2003-81444 filed in Japan on Mar. 24, 2003, the entire contents of which are hereby incorporated by reference.

FIELD OF THE INVENTION

The present invention relates to an image processing apparatus capable of outputting three-dimensional image data for carrying out a three-dimensional image display, relates to an image pickup system, an image display system, and image pickup display system each of which includes the image processing apparatus, relates to an image processing program causing a computer to operate as the image processing apparatus, and relates to a computer-readable recording medium in which the image processing program is recorded.

BACKGROUND OF THE INVENTION

An image display apparatus for carrying out a three-dimensional image display has been ever used for various purposes such as for games, CAD (Computer Aided Design) systems, aircrafts, or medical devices.

The three-dimensional image can be shown to a user by providing both eyes of the user with object image having an azimuth difference. This is the principle of showing the three-dimensional image to the user. Known are the following typical ways to provide the user with the three-dimensional image.

The first one is the anaglyph principle. According to this principle, the user is provided with a red image for the right eye and a blue image for the left eye, by using an ordinary image display apparatus. In this case, the user should wear an eyeglass provided with blue and red films so that only the red image reaches to the right eye and only the blue image reaches to the left eye, respectively. Thus, the respective eyes of the user can receive only one of the two images corresponding to the respective eyes.

The second one is the polarization eyeglass principle. According to this principle, an image display apparatus for the right eye and an image display apparatus for the left eye are used, and polarization plates, whose planes of polarization are orthogonal to one another, are provided in front of the respective image display apparatuses, so that the images which have passed through the respective polarization plates are combined by a half mirror and directed to the user. In this case, the user should wear an eyeglass provided with polarization plates, whose planes of polarization are orthogonal to one another, so that only the respective images that have passed through the above-described polarization plates can reach to the respective eyes of the user. Thus, the respective eyes of the user can receive only one of the two images corresponding to the respective eyes.

The third one is the time-sharing shutter principle. According to this principle, images having respective azimuth differences are periodically switched and displayed by an ordinary image display apparatus. In this case, the user should wear an eyeglass whose shutters for the respective right and left eyes are alternately and periodically closed. The closing of the shutters and the switching of the images are carried out in synchronization with each other, so that the respective eyes of the user can receive only one of the two images corresponding to the respective eyes.

The fourth one is the parallax barrier principle. This principle is disclosed in U.S. Pat. No. 6,392,690 (issued on May 21, 2002), for example. The following description deals with this principle with reference to FIGS. 19 and 20.

According to this principle, a three-dimensional image display apparatus 150 is arranged such that (a) a display device such as a liquid crystal display device 151 is sandwiched by upper and lower linear polarization plates 162 and 163, and (b) a parallax barrier 171 is further provided in front of a display screen of the liquid crystal display device 151. The liquid crystal display device 151 includes pixel groups 164 each made of n pixels. The pixels in the pixel groups 164 are disposed as follows.

More specifically, they are disposed like (R1, G2, B3, ..., Rn), (G1, B2, R3, ..., Gn), (B1, R2, R3, ..., Bn), and so on. Note that (a) the pixels in the same parentheses are assumed to belong to the same pixel group 164, (b) the R, G, and B indicate pixels that are driven in response to color signals corresponding to red, green, and blue colors, respectively, and (c) each subscript number indicates one of the n azimuth difference images. Thus, in the liquid crystal display device 151, the respective pixels displaying the azimuth difference images are arranged R, G, and B in this order.

Note that the n azimuth difference images indicate n images which are obtained by viewing an object from 1 through n directions, respectively. The principle of using n images is generally referred to as n-eye type.

The parallax barrier 171 includes a plurality of slits each functioning as an opening section 172, and light shielding sections 173, as shown in FIG. 19. In the three-dimensional image display apparatus 150, the pixel groups 164 and the opening sections 172 are provided such that one pixel group 164 in the liquid crystal display device 151 corresponds to one opening section 172.

With the arrangement, the outgoing light from the respective pixels in the liquid crystal display device 151 is fundamentally directed in all directions. The outgoing light from the pixels belonging to a same pixel group 164 passes through a same opening section 172 as shown by optical paths indicated by arrows in FIG. 19.

This allows that observation regions E1 through En in which "1" through "an" images can be observed, respectively, are formed in a space-division manner in front of the three-dimensional image display apparatus 150 (see FIG. 20). For example, when a user put his or her eyes in the observation region E1, the user can entirely observe "1" image displayed by the liquid crystal display device 151. Accordingly, when a user, on an opposite side of the liquid crystal display device 151 with respect to the parallax barrier 171, puts his or her respective eyes in any two observation regions among the observation regions E1 through En, the user can select one of the "1" through "n" images so as to observe the three-dimensional image. In other words, the user can observe various three-dimensional images in accordance with an angle in which the user views.

The fifth one is the lenticular lens principle. This principle is disclosed in the foregoing U.S. Pat. No. 6,392,690, for example. The following description deals with this principle with reference to FIG. 21.

According to this principle, a three-dimensional image display apparatus 150 is arranged such that the parallax barrier 171 is replaced with a lenticular lens 181 that is provided in front of the display screen of the liquid crystal display device 151.

The lenticular lens 181 is arranged such that a plurality of cylindrical lenses 182 are aligned on a substrate 183, and such that one pixel group 164 of the liquid crystal display device 151 corresponds to one cylindrical lens 182. When a user observes the display screen via the lenticular lens 181, an image which the user can observe is selected by the cylindrical lens 182 in accordance with an angle in which the user views.

For example, when a user is in a direction (in a direction indicated as a solid arrow in FIG. 21) where the outgoing light from a pixel (hereinafter referred to as pixel 1) that displays an image of an object viewed from a direction "1" passes through a principal point of the cylindrical lens 182, the user can observe only the image of the pixel 1 shown by a region indicated as two broken lines. Thus, when the lenticular lens 181 is provided in front of the liquid crystal display device 151, the effects similar to those of the case where the parallax barrier 171 is provided are obtained.

As described above, the U.S. Pat. No. 6,392,690 discloses a technique for carrying out the three-dimensional image display, however, does never consider a technique for switching a three-dimensional image and a two-dimensional image and for displaying the image thus switched.

SUMMARY OF THE INVENTION

The present invention is made for solving the foregoing problem, and features consistent with some embodiments of the present invention are to provide an image processing apparatus or the like that is capable of switching a three-dimensional image and a two-dimensional image and capable of displaying the image thus switched.

In order to achieve the feature, an image processing apparatus is provided with: (a) reduction calculation section(s) for reducing the number of a plurality of input image data, corresponding to a plurality of images that satisfy azimuth difference relations each other, in a lateral direction, respectively; (b) a three-dimensional processing section for combining the image data that have been reduced the number by the reduction calculation section(s) so as to prepare a three-dimensional image data; and (c) a display switching control section for switching and selecting which one of three-dimensional image data prepared by the three-dimensional processing section and two-dimensional image data prepared by using one of the plurality of input image data should be outputted.

According to the image processing apparatus having the above arrangement, a plurality of images that satisfy azimuth difference relations each other are picked up with the use of a plurality of ordinary image pickup devices, and input image data from the image pickup devices are supplied, thereby ensuring that a three-dimensional image data for three-dimensional image display and a two-dimensional image data for two-dimensional image display are switched and outputted to an image display apparatus.

More specifically, when carrying out the three-dimensional image display, the reduction calculation section reduces the number of the respective input image data in a lateral direction so as to prepare the plural reduced image data. The plural reduced image data are combined by the three-dimensional processing section, so as to prepare the three-dimensional image data. On the other hand, when carrying out the two-dimensional image display, it is possible to prepare the two-dimensional image data by using one of the plurality of input image data. The display switching control section can switch and select which one of the two-dimensional image data and the three-dimensional image data should be outputted.

Thus, it is possible to realize the two-dimensional image display and the three-dimensional image display with the use of a single device arrangement. For example, in response to user's instruction on switching of displays, it is possible to switch the two-dimensional image display and the three-dimensional image display, and to select one of them, with ease.

In the image processing apparatus, the reduction calculation sections are provided as many as the input image data.

With the arrangement, it is possible to carry out the reducing the number of the plural input image data simultaneously and in parallel. This makes it possible for the three-dimensional processing section to prepare a three-dimensional image data without a frame memory that asks for a large memory capacity and the like. Accordingly, it is possible to simplify the device arrangement of the three-dimensional processing section.

In the image processing apparatus, the reduction calculation section temporally switches the plurality of input image data and reduces the number of the input image data thus switched, respectively, so as to output the respective reduced image data in a time-sharing manner.

With the arrangement, the reduction calculation section temporally switches the plural input image data and reduces the number of the input image data thus switched, respectively. Accordingly, it is possible to reduce the number of the plural input image data with the use of a single reduction calculation section. Because of this, it is not necessary to provide plural reduction calculation sections so as to correspond to the number of the input image data, thereby ensuring to reduce the number of the reduction calculation sections.

In the image processing apparatus, the reduction calculation section carries out a thinning with respect to the input image data so as to reduce the number of the input image data.

With the arrangement, it is possible to reduce the amount which the reduction calculation section should reduce the number of the input image data. This ensures to realize an image processing apparatus which allows the circuit scale to get smaller and allows the power consumption to lower.

In the image processing apparatus, the number of the input image data is n (n: integer of not less than 2), and the three-dimensional processing section combines the reduced image data corresponding to m (m: integer of not less than 2 but less than n) input image data among the n input image data so as to prepare the three-dimensional image data.

With the arrangement, it is possible to prepare a three-dimensional image data with the use of the reduced image data corresponding to a predetermined number of input image data that have been selected among the inputted input image data.

An image pickup system in accordance with the present invention, in order to achieve the foregoing feature, is provided with: (a) any one of the image processing apparatus; and (b) an image pickup device for picking up the plurality of images that satisfy azimuth difference relations each other so as to obtain the plurality of input image data, and for supplying said image processing apparatus with the plurality of input image data.

An image display system in accordance with the present invention, in order to achieve the foregoing feature, is provided with: (a) any one of the image processing apparatus; and (b) an image display apparatus for carrying out three-dimensional image display and two-dimensional image display in response to the three-dimensional image data and the two-dimensional image data that are outputted from the image processing apparatus, respectively.

An image pickup display system in accordance with the present invention, in order to achieve the foregoing feature, is provided with: (a) any one of the image processing apparatus; (b) image pickup device for picking up the plurality of images that satisfy azimuth difference relations each other so as to obtain the plurality of input image data, and for supplying the image processing apparatus with the plurality of input image data; and (c) an image display apparatus for carrying out three-dimensional image display and two-dimensional image display in response to the three-dimensional image data and the two-dimensional image data that are outputted from the image processing apparatus, respectively.

In the image pickup display system: (a) the number of the input image data that are supplied to the image pickup device is n (n: integer of not less than 2), (b) the image display apparatus can carry out the three-dimensional image display of n-eye type that has a resolution of (transversal w-line× longitudinal h-line), where each of w and h is a positive integer, and (c) the said image pickup device has a higher resolution than a resolution of (transversal w/n-line×longitudinal h-line).

With the arrangement, even in the case when constituting an image pickup display system with the use of an image pickup device having a different resolution than an image display apparatus having a resolution of (transversal w-line× longitudinal h-line), it is possible to carry out the reduction calculations in the reduction calculation section by using an image pickup device that has a higher resolution than a resolution of (transversal w/n-line×longitudinal h-line).

In the image pickup display system, the image pickup device has different resolutions for the respective input image data.

According to the present invention, an image processing program, causing said image processing apparatus to operate, causes a computer to function as the respective sections of the image processing apparatus. According to the present invention, the image processing program is recorded in a computer-readable recording medium.

For a fuller understanding of the nature and advantages of the invention, reference should be made to the ensuing detailed description taken in conjunction with the accompanying drawings.

BRIEF DESCRIPTION OF THE DRAWINGS

FIG. 21 is a cross sectional view showing a cross section of a conventional image display apparatus of a lenticular lens type.

DESCRIPTION OF THE EMBODIMENTS

First Embodiment

The following description deals with a first embodiment of the present invention with reference to FIG. 1 through FIG. 6.

Figure 1:
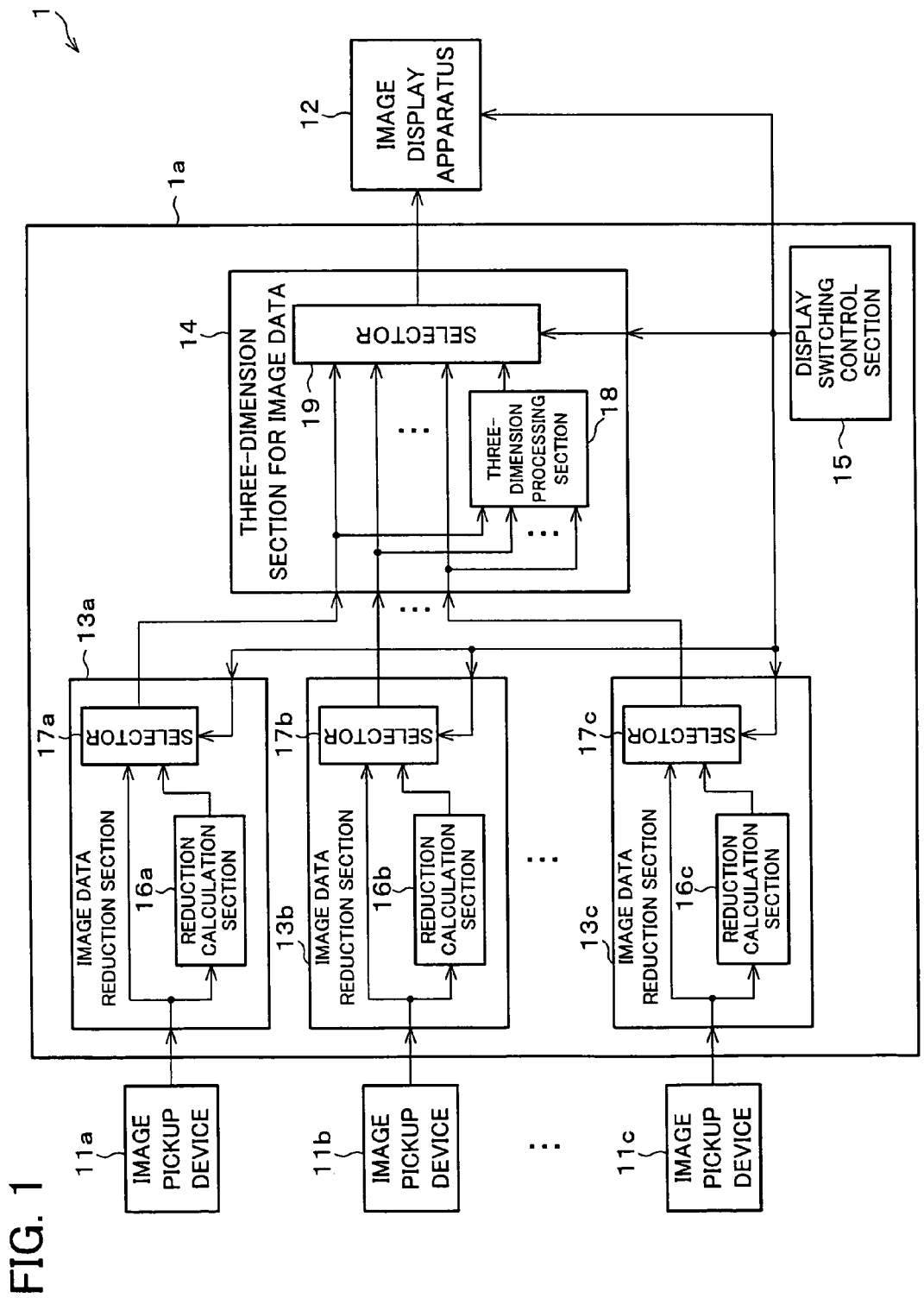
FIG. 1 is a block diagram showing a structure of an image pickup display system of a first embodiment in accordance with the present invention.

FIG. 1 is a block diagram showing an image pickup display system 1 of the present embodiment. The image pickup display system 1 includes image pickup devices 11a, 11b, and 11c (image pickup means), an image display apparatus 12 (image display means), and an image processing apparatus 1a (image processing means). Here, it is assumed that the three image pick up devices 11a, 11b, and 11c are adopted, but the present invention is not limited to this, provided that at least two image pickup devices are adopted. Note that when image pick up devices 11a, 11b, and 11c are given a generic name, they may be referred to as an image pickup device 11.

The image pick up devices 11a, 11b, and 11c are arranged so as to include devices such as a CCD camera or a CMOS image sensor, respectively. The respective image pick up devices 11a, 11b, and 11c carry out an image pickup so as to prepare an image data, and the image data thus prepared is outputted to the image processing apparatus 1a. Especially, the image pick up devices 11a, 11b, and 11c can carry out an image pickup with respect to three azimuth difference images so as to output to the image processing apparatus 1a the image data corresponding to the respective image pick up devices 11a, 11b, and 11c.

Figure 19:
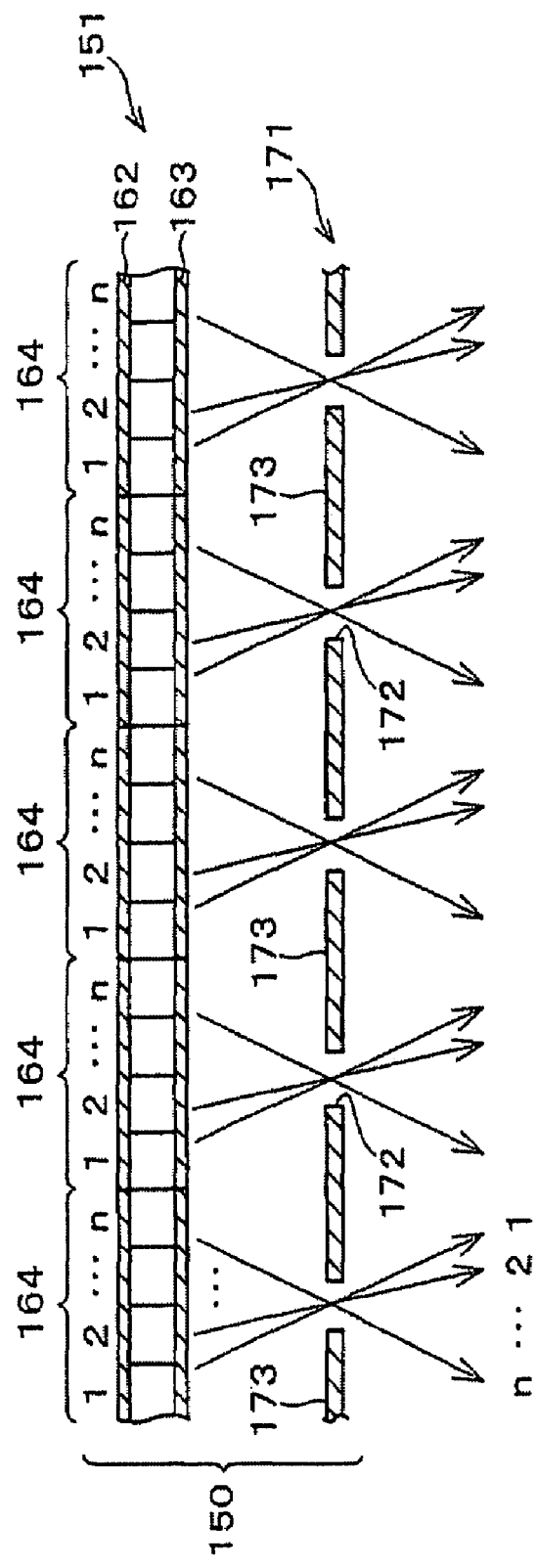
FIG. 19 is a cross sectional view showing a cross section of a conventional image display apparatus of parallax barrier type.

When the image display apparatus 12, as later described, receives a three-dimensional image data that is prepared by the image processing apparatus 1a, the image display apparatus 12 can carry out a three-dimensional image display. When the image display apparatus 12 receives a two-dimensional image data that is an image data prepared by either one of the image pick up devices 11a, 11b, and 11c, the image display apparatus 12 can also carry out a two-dimensional image display. The image display apparatus 12 is not limited to this, provided that both three-dimensional image display and two-dimensional image display can be carried out. For example, the foregoing three-dimensional image display apparatus 150 shown in FIG. 19 or FIG. 21 may be adopted.

The image processing apparatus 1a includes: image data reduction sections 13a, 13b, and 13c provided so as to correspond to the image pick up devices 11a, 11b, and 11c, respectively; a three-dimension section 14 for image data; and a display switching control section 15. Note that when image data reduction sections 13a, 13b, and 13c are given a generic name, they may be referred to as an image data reduction section 13.

The image data reduction sections 13a, 13b, and 13c include reduction calculation sections 16a, 16b, and 16c (reduction calculation means), respectively, and include selectors 17a, 17b, and 17c, respectively. Note that when the reduction calculation sections 16a, 16b, and 16c are given a generic name, they may be referred to as an reduction calculation section 16. Note also that when the selectors 17a, 17b, and 17c are given a generic name, they may be referred to as a selector 17.

The reduction calculation sections 16a, 16b, and 16c carry out reduction calculations for reducing the number of images in a lateral direction with respect to plural image data from the image pick up devices 11a, 11b, and 11c, respectively. The plural image data are plural image data (input image data) that correspond to the above images that satisfy azimuth difference relations each other. When it is assumed that each number of the image pick up device 11 and the image data reduction section 13 is equal to n (here, n=3 is satisfied), respectively, the reduction calculation section 16 reduces the number of the input image-data to be 1/n in a lateral direction. Here, "to reduce the number of the image data in a lateral direction" means to reduce the data amount of the image data in a lateral direction. Especially, in a case of the image data of matrix type, "to reduce the number of the image data in a lateral direction" means to reduce the number of the columns.

The reducing the number of the input image data to be 1/n in a lateral direction may be made by using an algorism of a method such as the nearest neighbor method, the bi-linear method, or the bi-cubic method that is well known as the method for reducing images.

The selectors 17a, 17b, and 17c select and output either one of (a) the input image data itself that is supplied to the image data reduction sections 13a, 13b, and 13c, respectively, and that has not been subject to any processing and (b) the image data (reduced image data) that have been subject to the reducing the number by the respective reduction calculation sections 16a, 16b, and 16c. The selections of the selectors 17a, 17b, and 17c are respectively carried out in response to the display switching control section 15.

The three-dimension section 14 for image data includes a three-dimension processing section 18 (three-dimension processing means) and a selector 19. The three-dimension processing section 18 and the selector 19 respectively receive the image data from the selectors 17a, 17b, and 17c of the image data reduction sections 13a, 13b, and 13c, respectively.

The three-dimension processing section 18 combines the plural image data of which the reduction calculation sections 16a, 16b, and 16c have respectively reduced the number, so as to prepare the three-dimension image data.

The selector 19 selects either one of the three-dimension image data and a predetermined one of the three image data (representative image data) from the selectors 17a, 17b, and 17c, and outputs them to the image display apparatus 12. The selection of the selector 19 is carried out in response to the display switching control section 15.

Note that the selection of the selector 19 is carried out in cooperation with the selections of the selectors 17a, 17b, and 17c under the controlling of the display switching control section 15. More specifically, when the selector 19 selects the three-dimensional image data, the selectors 17a, 17b, and 17c select the reduced image data, respectively. On the other hand, when the selector 19 selects the representative image data, the selectors 17a, 17b, and 17c select the input image data that have not been subject to the reducing the number, respectively.

Accordingly, when the selector 19 selects the representative image data, the image data outputted from the selector 19 is either one of the three input image data that have not been subject to the reducing the number, namely, the image data is a two-dimensional image data. Note that the two-dimensional image data is not necessarily the input image data itself, for example, the two-dimensional image data may be an image data obtained by carrying out the ordinary image processing with respect to the input image data. In other words, the two-dimensional image data is not limited to a specific one, provided that the two-dimensional image data is prepared by using either one of the three input image data.

The display switching control section 15 controls the selections of the selectors 17 and 19 as described above in accordance with the instructions from a user on switching of the three-dimensional image display and the two-dimensional image. The instructions from the user on switching of the three-dimensional image display and the two-dimensional image are sent to the display switching control section 15 from a display switching input device (not shown), when the user operates the display switching input device.

Thus, the display switching control section 15 functions as switching means for switching whether the image processing apparatus 1a should output the three-dimensional image data prepared by the three-dimension processing section 18 or should output the two-dimension image data prepared by using either of the plural input image data.

Note that, when the two-dimension image data is outputted, it may be arranged such that the selector 19 can switch in response to the display switching control section 15 so as to select which one of the plural input image data that have been picked up by the image pickup devices 11a, 11b, and 11c should be used.

The following description deals with a case as one example where an image pickup display system 1 includes image pickup devices 11a and 11b which pick up azimuth difference images for the right eye and for the left eye, respectively, so as to carry out a three-dimensional image display. Namely, the following description deals with a case of carrying out a three-dimensional image display of two-eye type.

Figure 3:
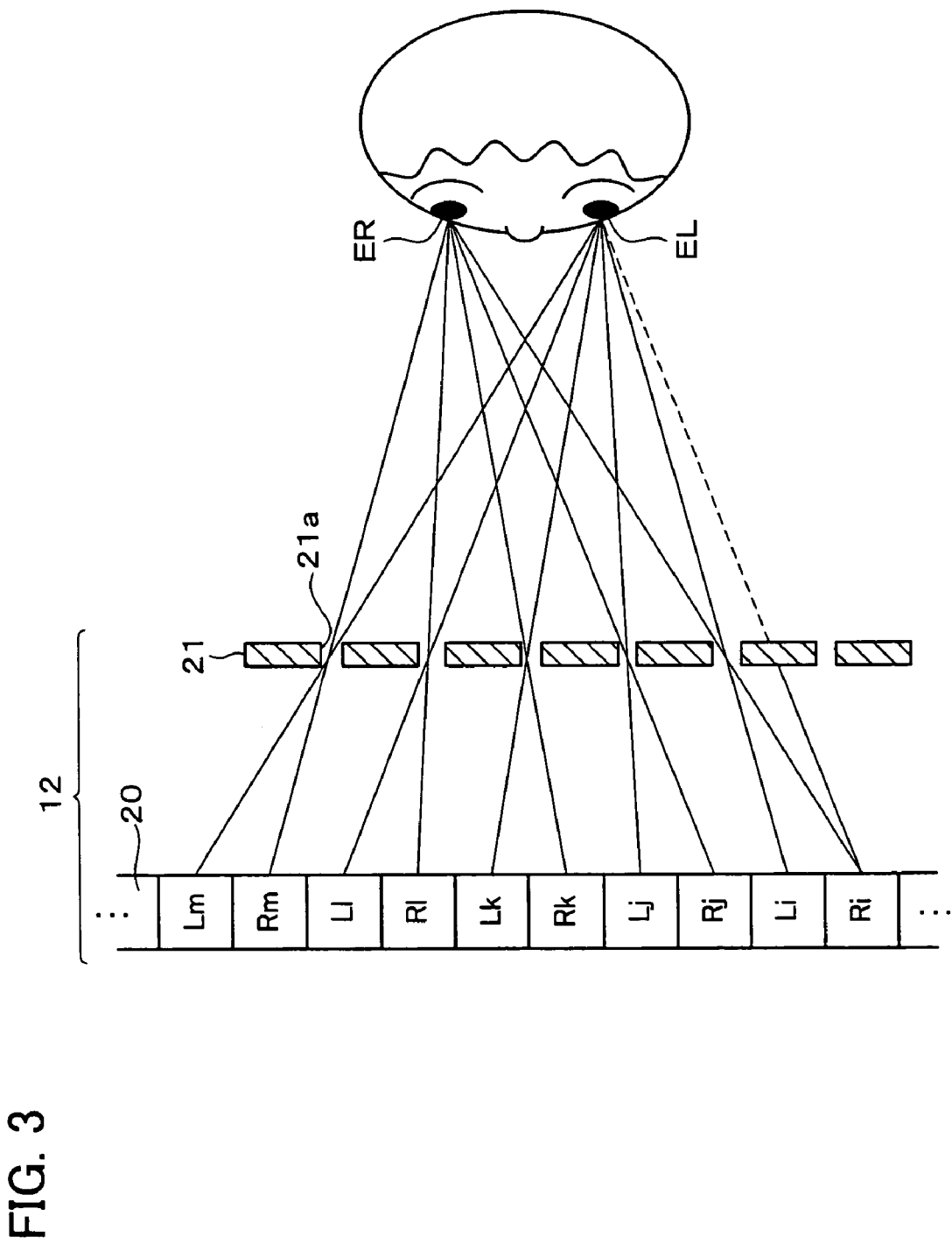
FIG. 3 is a plan view showing the relation between an image display apparatus and a user in order to explain the three-dimensional image display based on the parallax barrier principle.
Figure 4:
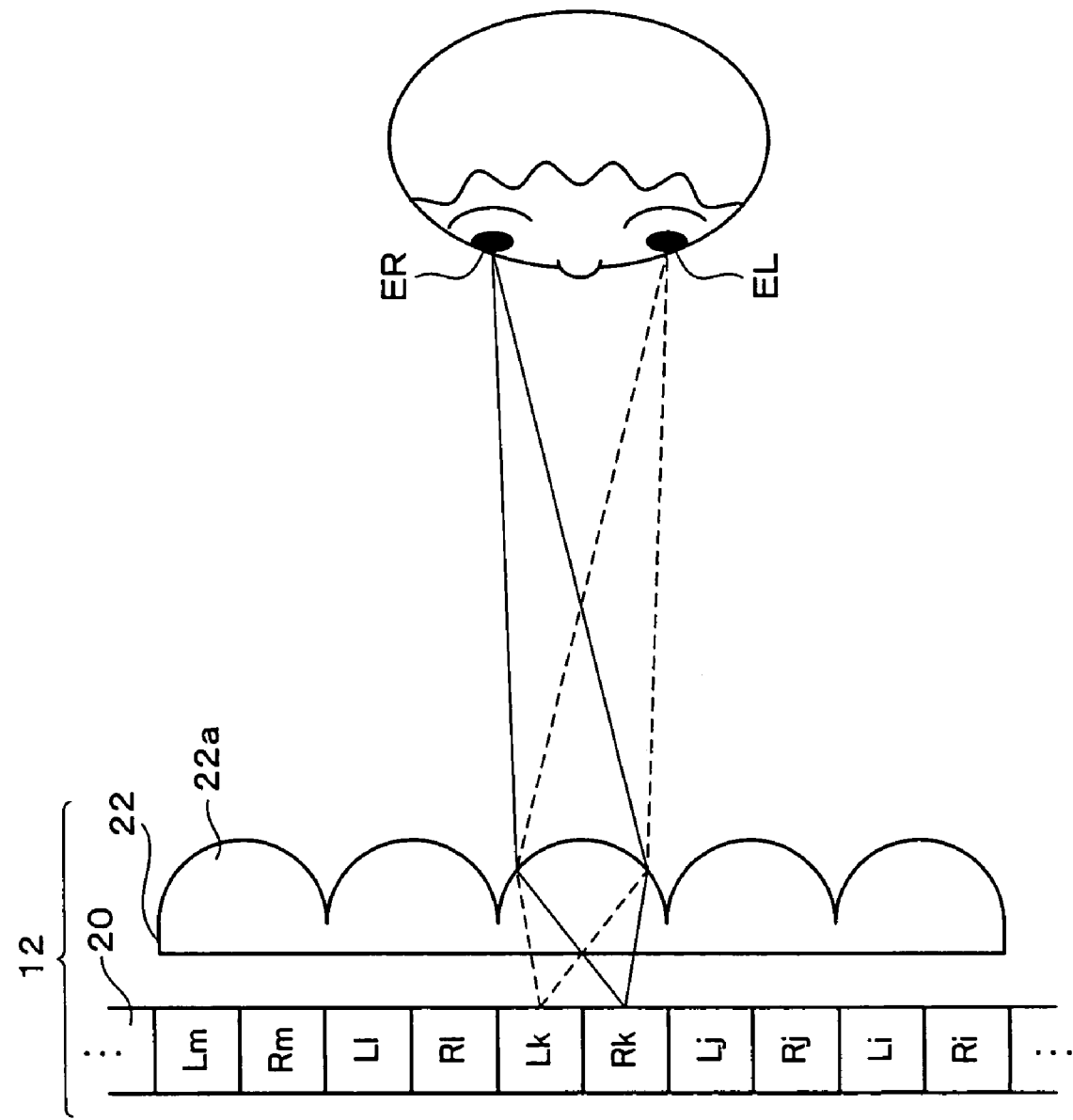
FIG. 4 is a plan view showing the relation between an image display apparatus and a user in order to explain the three-dimensional image display based on the lenticular lens principle.

First, the principle of the three-dimensional image display of two-eye type will be described. FIG. 3 and FIG. 4 show the relation between an image display apparatus 12 and a user.

FIG. 3 shows a case where a display apparatus of parallax barrier type is adopted as an image display apparatus 12. The image display apparatus 12 includes a parallax barrier 21, having a plurality of openings 21a, provided in front of a display screen of a liquid crystal display device 20. The image display apparatus 12 allows the user to view only images respectively corresponding to right eye ER and left eye EL of the user in a specific area in front of the parallax barrier 21.

This is realized as follows. In the liquid crystal display device 20, (a) images Ri, Rj, Rk, Rl, and Rm for the right eye and (b) images Li, Lj, Lk, Ll, and Lm for the left eye are alternately disposed. When the user views the images via the parallax barrier 21, the user can view (a) the images Ri, Rj, Rk, Rl, and Rm only through the right eye and (b) the images Li, Lj, Lk, Ll, and Lm only through the left eye.

More specifically, for example, the user can view the image Ri through the right eye ER, because an opening 21a of the parallax barrier 21 is positioned on a line (solid line) connecting the image Ri and the right eye ER of the user. In contrast, the user cannot view the image Ri through the left eye EL, because no opening 21a is positioned on a line (broken line) connecting the image Ri and the left eye EL of the user. Thus, the user can view the inherent images in the respective left and right eyes through the left eye and through the right eye without a specific device such as an eyeglass.

FIG. 4 shows a case where a display apparatus of lenticular lens type is adopted as an image display apparatus 12. The image display apparatus 12 includes a lenticular lens 22 provided in front of a display screen of a liquid crystal display device 20. The image display apparatus 12 allows the user to view only images respectively corresponding to right eye ER and left eye EL of the user in a specific area in front of the lenticular lens 22.

This is realized as follows. In the liquid crystal display device 20, (a) images Ri, Rj, Rk, Rl, and Rm for the right eye and (b) images Li, Lj, Lk, Ll, and Lm for the left eye are alternately disposed. When the user views the images via the lenticular lens 22, the user can view (a) the images Ri, Rj, Rk, Rl, and Rm only through the right eye and (b) the images Li, Lj, Lk, Ll, and Lm only through the left eye.

The lenticular lens 22 includes a unit structure in which one lens 22a is assigned to a pair of images for the left and right eyes. The lenticular lens 22 is composed of a plurality of unit structures. The outgoing light from the image Rk, for example, is refracted by the lens 22a so as to be directed to only the right eye ER of the user. The outgoing light from the image Lk is refracted by the lens 22a so as to be directed to only the left eye EL of the user. Thus, the user can view the inherent images in the respective left and right eyes through the left eye and through the right eye without a specific device such as an eyeglass.

Figure 20:
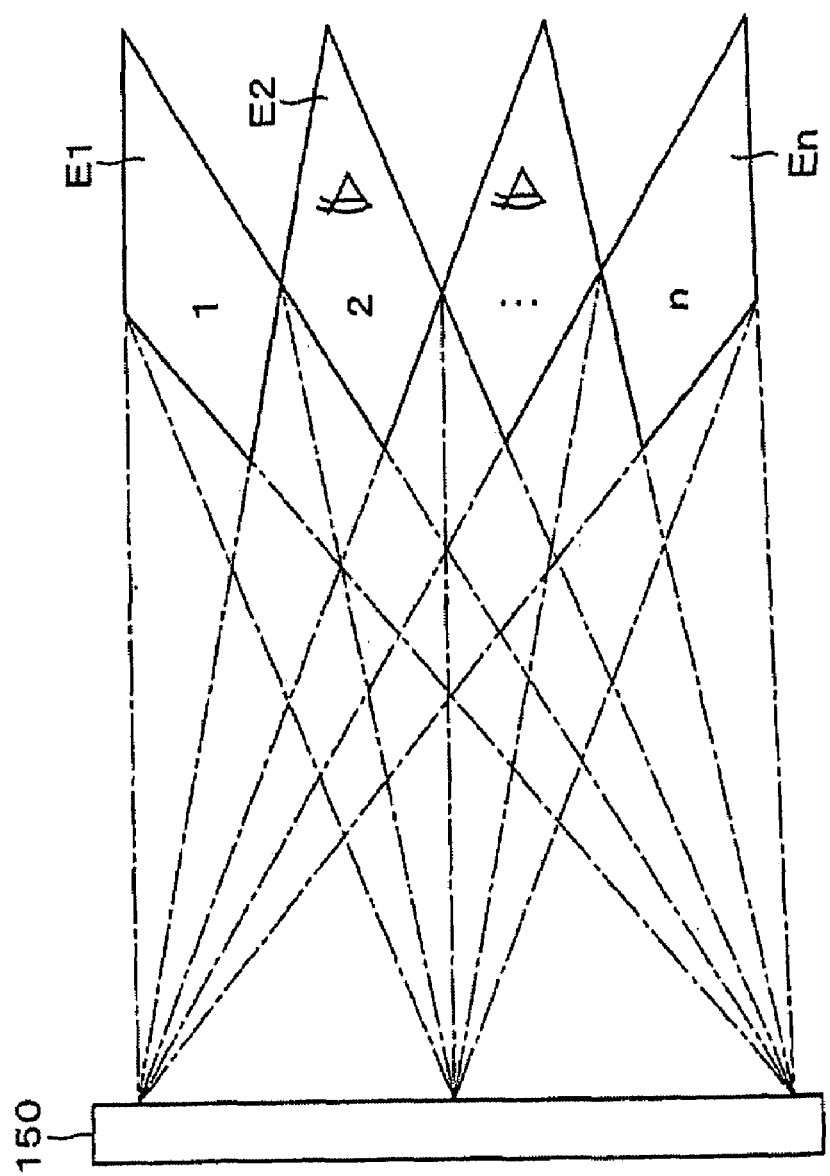
FIG. 20 is a plan view showing how the image display apparatus shown in FIG. 19 relates to a user in order to explain the principle of a three-dimensional image display.

In the respective types of parallax barrier type and of lenticular lens type, the images only for the right eye and the images only for the left eye are alternately disposed for each column in the liquid crystal display device 20. Note that the case of a three-dimensional image display of n-eye type was already described with reference to FIG. 19 through FIG. 21 as a conventional technique.

Figure 2:
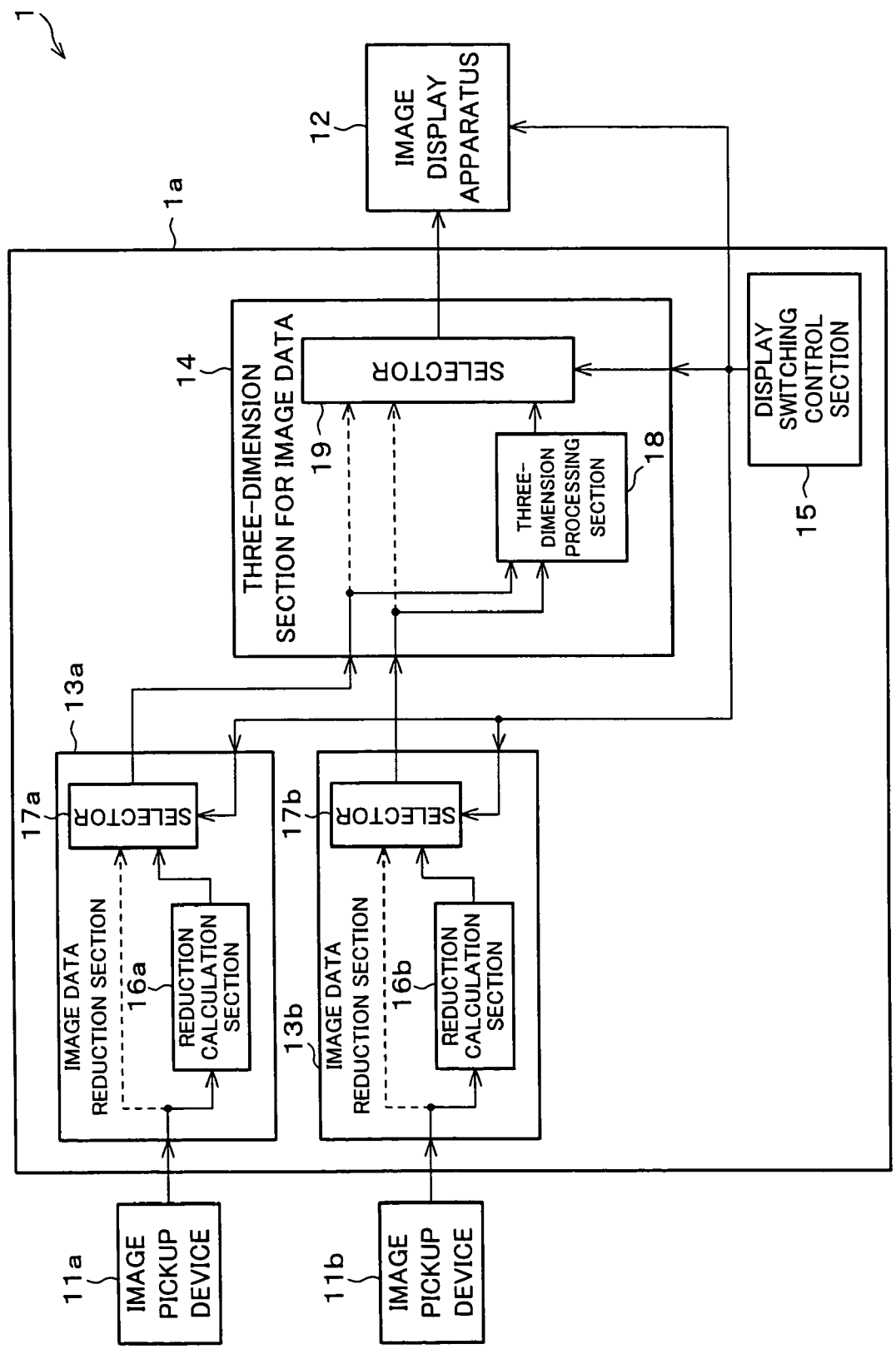
FIG. 2 is a block diagram showing how image data flows in the case of carrying out a three-dimensional image display in the image pickup display system shown in FIG. 1.
Figure 5:
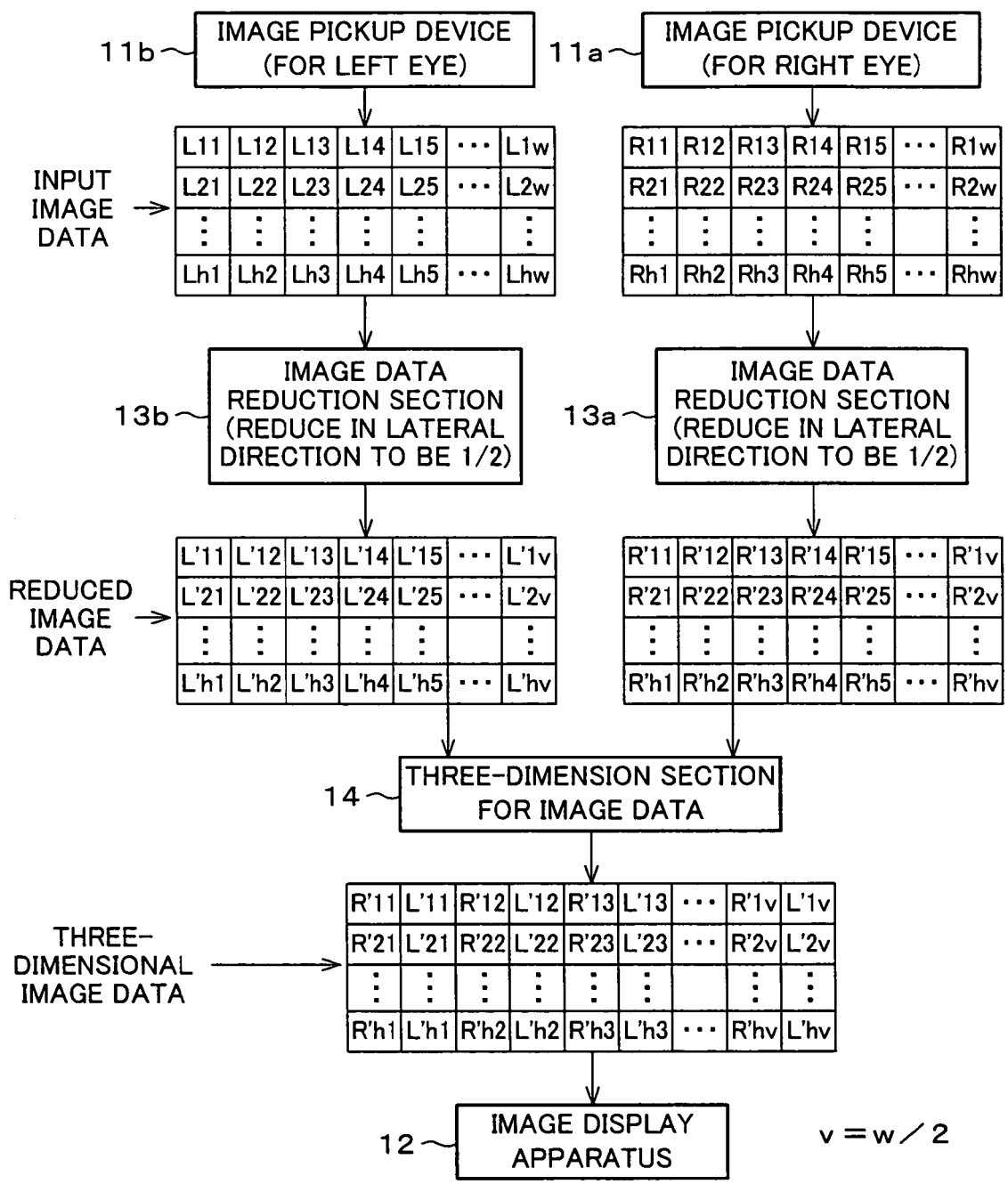
FIG. 5 is a block diagram showing how image data changes among blocks of the image pickup display system shown in FIG. 1 in the case where a three-dimensional image display is carried out by the image pickup display system.

The following description deals with a method in which an image processing apparatus 1a prepares a three-dimensional image data for carrying out the above display, with reference to FIG. 2 and FIG. 5. When carrying out a three-dimensional image, the image data is processed in accordance with the flow indicated by solid lines shown in FIG. 2. This gives rise to the fact that the flow of the image data indicated by broken lines shown in FIG. 2 is not selected by selectors. FIG. 5 shows how the image data changes between an image pickup device 11 and the image display apparatus 12

Input image data, having a resolution of (transversal w-line×longitudinal h-line) (w, h: positive integer), that have been picked up by respective image pickup devices 11a and 11b are supplied to image data reduction sections 13a and 13b, respectively, such that reduction calculation sections 16a and 16b reduce the number of the respective input image data in a lateral direction to be ½. The input image data thus become reduced image data each having a resolution of (transversal v(v=w/2)-line×longitudinal h-line), and are outputted to a three-dimension section 14 for image data via selectors 17a and 17b, respectively. The respective reduced image data are combined by a three-dimensional processing section 18 of the three-dimension section 14 such that the columns of the respective reduced image data are alternately disposed. Thus, the respective reduced image data are converted into a three-dimensional image data so as to have a format better suited for the image display apparatus 12. The three-dimensional image data thus converted is outputted to the image display apparatus 12 via the selector 19, thereby allowing the image display apparatus 12 to carry out the three-dimensional image display. Here, it is assumed that the image display apparatus 12 has a resolution of (transversal w-line×longitudinal h-line), and that the three-dimensional image data has a data size of (transversal w-line×longitudinal h-line).

In FIG. 5, "Rij" indicates a data of a pixel whose row and column are "i" and "j" respectively, in the input image data outputted from the image pickup device 11a for the right eye, and "Lij" indicates a data of a pixel whose row and column are "i" and "j", respectively, in the input image data outputted from the image pickup device 11b for the left eye. Note that "R'ij" and "L'ij" indicate data of a pixel in the reduced image data that have gone through the image data reduction sections 13a and 13b, respectively. This is because the reduction calculation causes each data of the pixels to be different from the input image data.

In the present image processing apparatus 1a, the reduction calculation section 16 reduces the number of the image only in a lateral direction, not in a longitudinal direction. This ensures that the scale of the present calculation circuit is smaller than an ordinary reduction calculation circuit.

Figure 6:
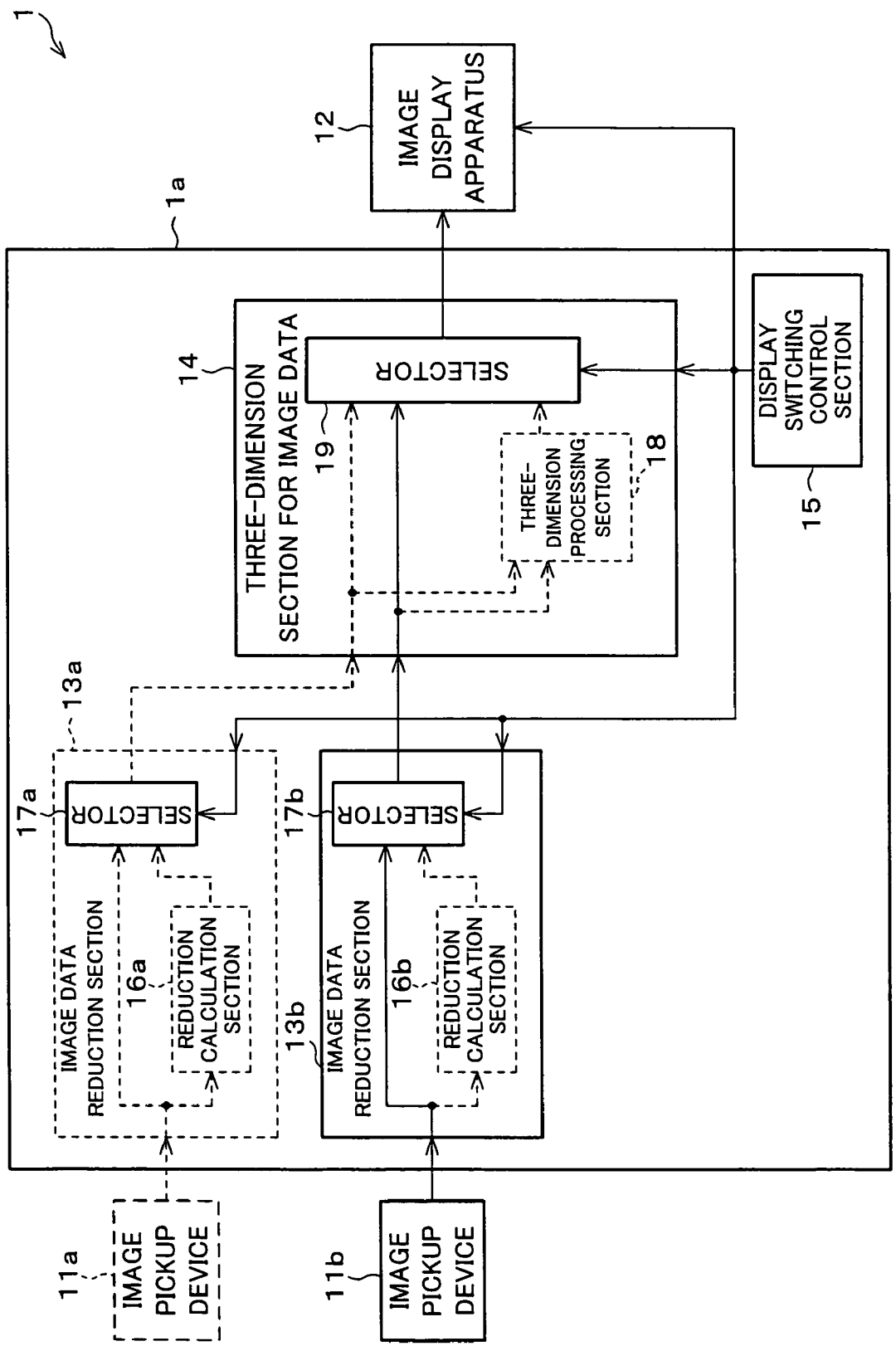
FIG. 6 is a block diagram showing how image data flows in the case of carrying out a two-dimensional image display in the image pickup display system shown in FIG. 1.

With reference to FIG. 6, the following description deals with how the image data is proceeded with when a two-dimensional image display is carried out. Here, supposed is a case where a two-dimensional image display is carried out with the use of the input image data picked up by an image pickup device 11b. Note that this case is merely an example, i.e., the present invention is not limited to this case.

When carrying out the two-dimensional image display, the image data is proceeded with in accordance with solid lines shown in FIG. 6. This gives rise to the fact that the proceedings indicated by broken lines shown in FIG. 6 are not selected by selectors and that the blocks indicated by broken lines are not used.

When the input image data, having a resolution of (transversal w-line×longitudinal h-line), that has been picked up by an image pickup device 11b is supplied to an image data reduction section 13b, the input image data is outputted to a three-dimension section 14 for image data via a selector 17b while its resolution is kept unchanged. In the three-dimension section 14, the input image data from the image data reduction section 13b is outputted to an image display apparatus 12 via a selector 19 without going through a three-dimension processing section 18, such that the image display apparatus 12 carries out the two-dimensional image display.

In this case, the selector 19 does not select the input image data from an image pickup device 11a. The two-dimensional image display is carried out in accordance with the input image data from the image pickup device 11b, accordingly. When carrying out the two-dimensional image display of the image which the image pickup device 11a has picked up, it will be required that a display switching control section 15 controls the selections such that the image data from the image data reduction section 13a is selected by the selector 19. This ensures to carry out the two-dimensional image display of the image that arbitrary one of the two image pickup devices 11a and 11b has picked up.

Thus, the image pickup display system 1 in accordance with the present embodiment includes (a) n image pickup devices 11, (b) n image data reduction section 13 that reduces the number of the respective image data which are picked up by the image pickup devices 11 to be 1/n in a lateral direction when carrying out the three-dimensional image display, whereas does not carry out any processing with respect to the image data when carrying out the two-dimensional image display, (c) a three-dimensional section 14 for image data for causing the image data from the respective image data reduction sections 13 to be a three-dimensional data and for supplying a succeeding circuit with the three-dimensional data when carrying out the three-dimensional image display, whereas supplying the succeeding circuit with only the image data from one of the image data reduction sections 13, (d) an image display apparatus 12, having a same resolution as that of the image pickup devices 11, that can carry out the three-dimensional image display and the two-dimensional image display, and (e) a display switching control section 15 for controlling which one of the three-dimensional image display and the two-dimensional image display should be carried out.

In the image pickup display system 1 in accordance with the present embodiment, a plurality of reduction calculation sections 16 are provided so as to correspond to the number of the input image data. With the arrangement, it is possible to carry out the reduction calculations simultaneously and in parallel with respect to the plural input image data. This ensures, in the processing of a three-dimensional processing section 18, to prepare the three-dimensional image data without large capacity memory means such as a frame memory, thereby simplifying the arrangement of the three-dimensional processing section 18.

Note that, in the image processing apparatus 1a, the three-dimensional image display is not necessarily carried out with the use of all the image data from the n image pickup devices 11. The image data from arbitrary m (m is not less than 2 and is less than n) image pickup devices 11 may be selectively used. Namely, when it is assumed that the number of the input image data is n, the three-dimensional section 14 for image data may prepare a three-dimensional image data by combining reduced image data corresponding to m input image data out of n input image data. Thus, it is possible to prepare a three-dimensional image data with the use of the reduced image data corresponding to a predetermined number of input image data that have been selected among plural input image data to be inputted.

Second Embodiment

The following description deals with the second embodiment of the present invention with reference to FIG. 7 through FIG. 14.

Figure 7:
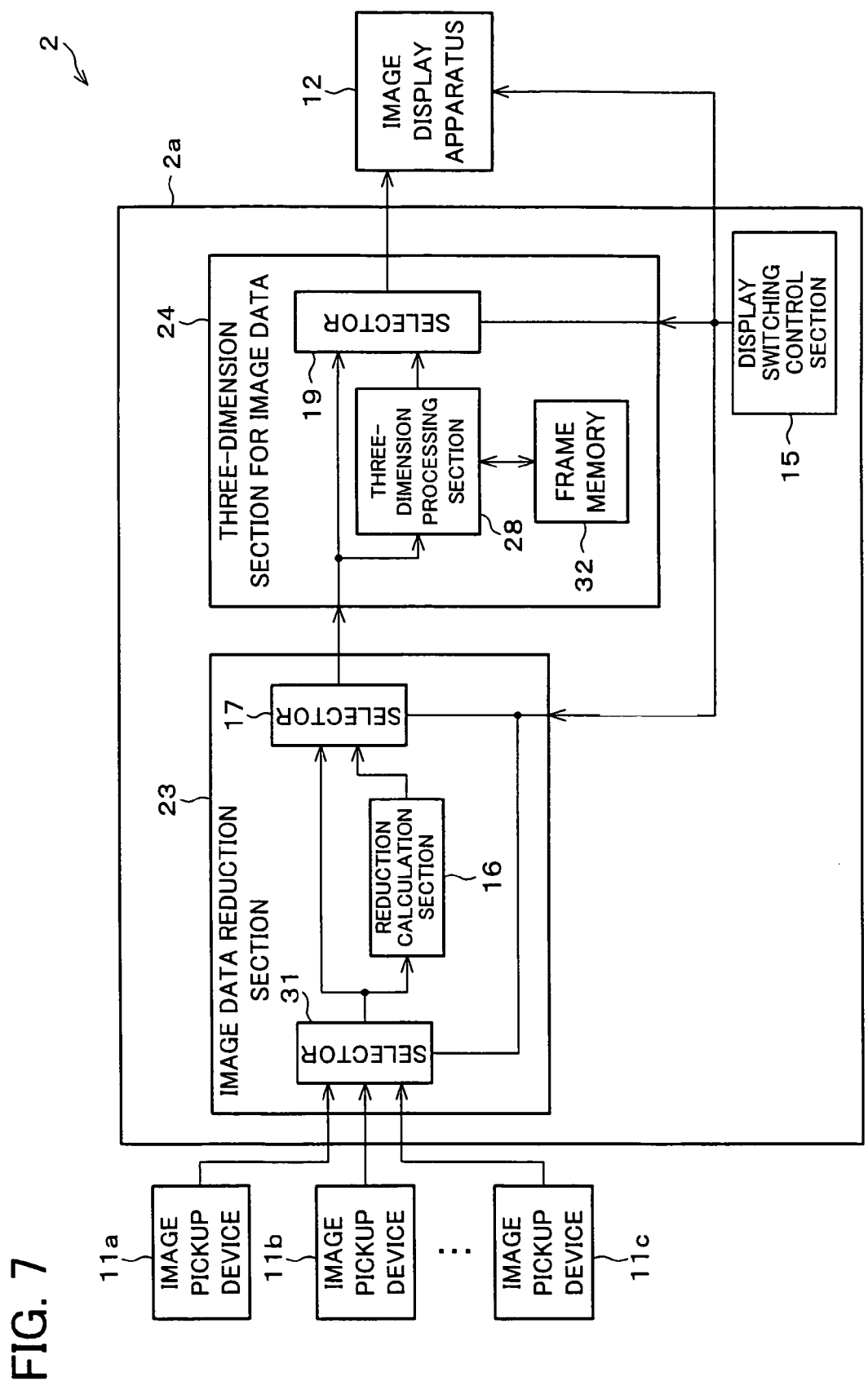
FIG. 7 is a block diagram showing a structure of an image pickup display system of a second embodiment in accordance with the present invention.

FIG. 7 shows a block arrangement of an image pickup display system 2 in accordance with the present embodiment. The image pickup display system 2 includes image pickup devices 11a, 11b, and 11c, an image display apparatus 12, and an image processing apparatus 2a. Note that the image pickup devices 1a, 1b, and 11c and the image display apparatus 12 have respectively same functions as those of the first embodiment reference numerals.

According to the present embodiment, the arrangement of the image processing apparatus 2a is different from the image processing apparatus 1a of the first embodiment. The image processing apparatus 2a includes an image data reduction section 23, a three-dimensional section 24 for image data, and a display switching control section 15. Note that the display switching control section 15 has a same function as that of the first embodiment. Note also that the image data reduction sections 23 and the three-dimensional section 24 for image data correspond to the image data reduction sections 13 and the three-dimensional section 14 for image data, but their arrangements and functions are different from each other as follows.

The image data reduction section 23 is not provided for the respective image pickup devices 11a, 11b, and 11c. A single image data reduction section 23 is shared among them. The input image data supplied to the image processing apparatus 2a from the respective image pickup devices 11a, 11b, and 11c are all sent to the image data reduction section 23.

The image data reduction section 23 includes a selector 31 in addition to a reduction calculation section 16 and a selector 17. Note that the reduction calculation section 16 has a same function as either one of the reduction calculation sections 16a, 16b, and 16c of the first embodiment, and that the selector 17 has a same function as either one of the selectors 17a, 17b, and 17c of the first embodiment. The selector 31 sequentially switch and selects the input image data of the respective image pickup devices 11a, 11b, and 11c so as to output the input image data thus selected to the reduction calculation section 16 and the selector 17, respectively.

With the arrangement, the image data reduction section 23 temporally switches the reduction calculations which the reduction calculation section 16 carries out for each input image data outputted from the image pickup devices 11a, 11b, and 11c, so as to output the reduced image data corresponding to the respective input image data in a time-sharing manner. More specifically, in the reduction calculation section 16, for example, the following processings (a) and (b) are repeated n times, the n times corresponding to the number of the image pickup devices: (a) when the reducing the number of the input image data from the image pickup device 11a is completed, the resultant reduced image data is supplied to a succeeding circuit; and (b) a similar processing to the above (a) is carried out for the input image data from the next image pickup device 11b.

Because of this, the selector 31 sequentially selects which one of the input image data from the respective image pickup devices 11a, 11b, and 11c should be outputted to a succeeding circuit. The selector 31 also sequentially selects which one of input image data should be outputted to a succeeding circuit, when outputting input image data of which is not reduced the number.

The three-dimensional section 24 for image data includes a frame memory 32 in addition to a three-dimensional processing section 28 and a selector 19. Note that the selector 19 has substantially the same function as the selector 19 of the first embodiment.

The three-dimensional processing section 28 is a member corresponding to the three-dimensional processing section 18, but differs in that the frame memory 32 is used when generating a three-dimensional image data by combining the plural image data (reduced image data) that have been subject to the reducing the number by the reduction calculation section 16. More specifically, the three-dimensional processing section 28 prepares the three-dimensional image data while sequentially storing in the frame memory 32 the reduced image data that have been time-shared by and outputted from the reduction calculation section 16. In view of this, the frame memory 32 has enough memory capacity to store the three-dimensional image data corresponding to the resolution of the image display apparatus 12.

More specifically, when the three-dimensional processing section 28 converts the reduced image data into the three-dimensional data, the three-dimensional processing section 28 sequentially receives the induced image data corresponding to the input image data from the respective image pickup devices 11a, 11b, and 11c. The three-dimensional processing section 28 prepares the three-dimensional image data while storing in the frame memory 32 the reduced image data thus received. Upon completion of receiving the n reduced image data that have been reduced the number to be 1/n in a lateral direction by the image data reduction section 23, the three-dimensional image data is finished up. The three-dimensional image data thus finished up is outputted to the image display apparatus 12 via the selector 19.

Figure 8:
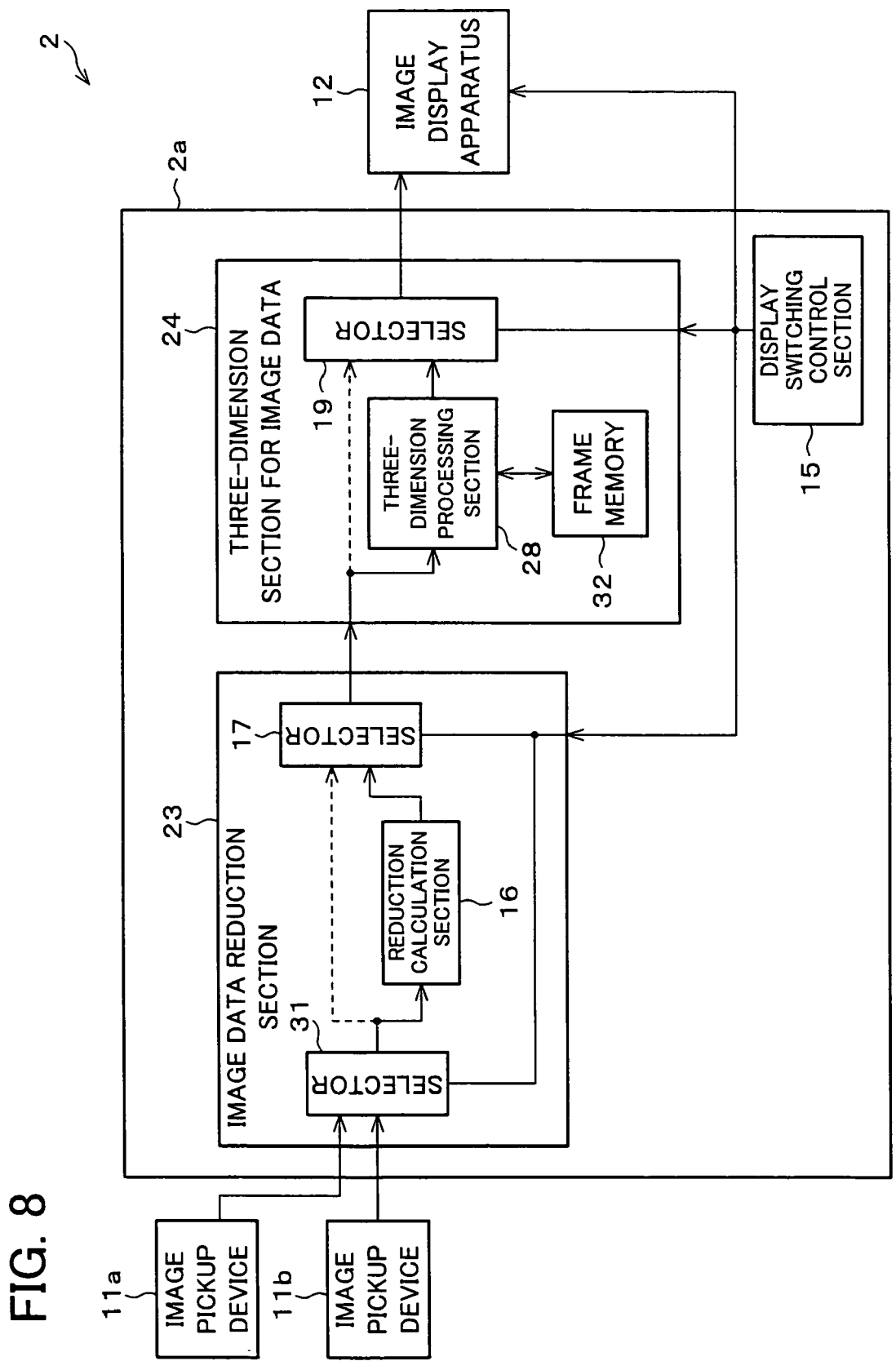
FIG. 8 is a block diagram showing how image data flows in the case of carrying out a three-dimensional image display in the image pickup display system shown in FIG. 7.
Figure 9:
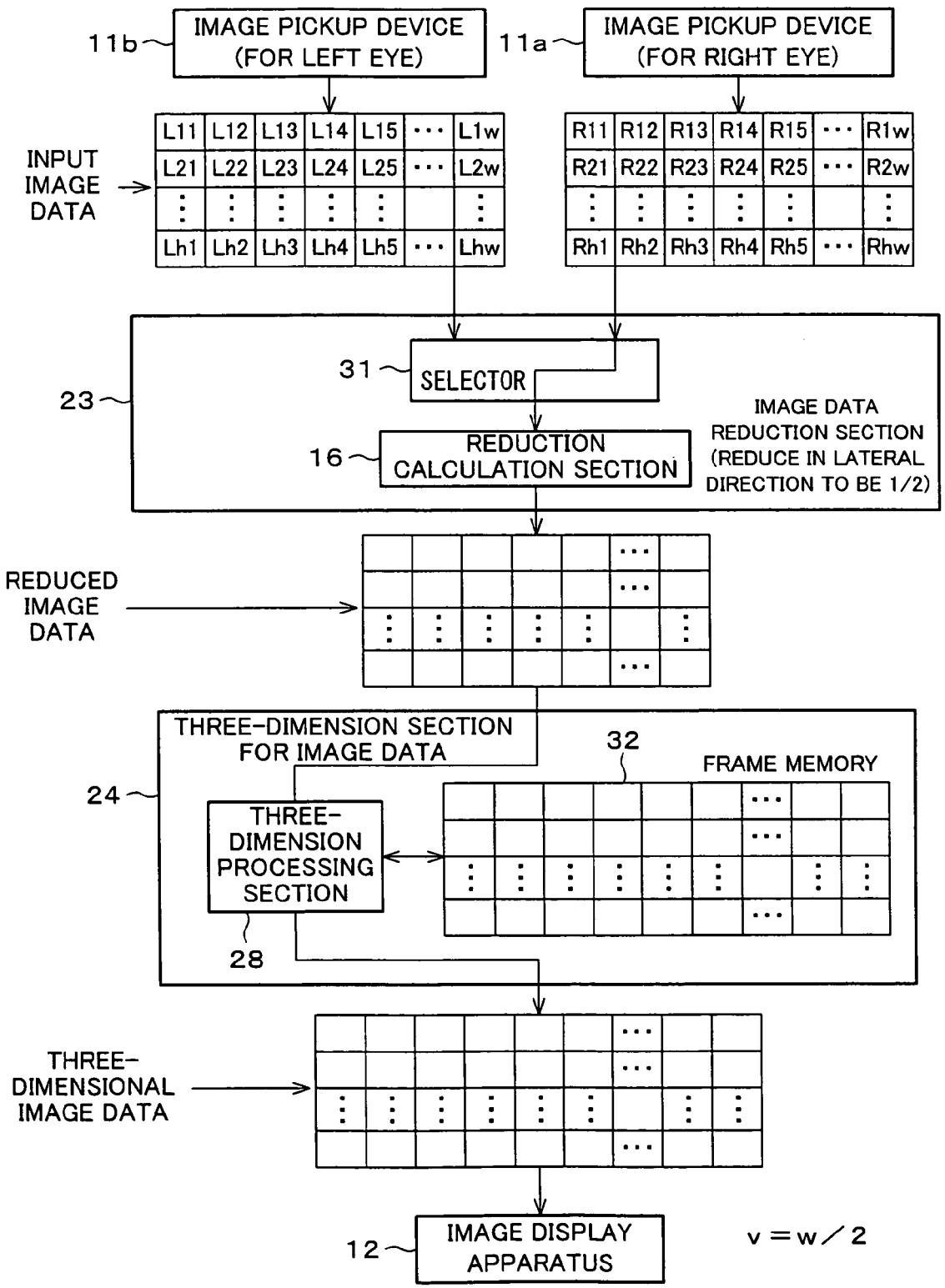
FIG. 9 is a block diagram showing how image data changes among blocks of the image pickup display system shown in FIG. 7 in the case where a three-dimensional image display is carried out by the image pickup display system, and especially is a block diagram showing that an input image data has been prepared by pickup apparatuses for the right and left eyes, respectively.

The following description deals with a case as an example where an image pickup display system 2 includes two image pickup devices 11a and 11b as shown in FIG. 8, and the two image pickup devices 11a and 11b pick up the azimuth difference images for the right and left eyes, respectively, so as to carry out a three-dimensional image display, i.e., carry out a three-dimensional image display of two-eye type.

When carrying out the three-dimensional image display, the image data is processed in accordance with the flow indicated by solid lines shown in FIG. 8. This gives rise to the fact that the flow of the image data indicated by broken lines is not selected by selectors. FIG. 9 through FIG. 13 show in a time series manner how the image data changes between the image pickup device 11 and the image display apparatus 12.

In FIG. 9 through FIG. 13, "Rij" indicates a data of a pixel whose row and column are "i" and "j", respectively, in the input image data outputted from the image pickup device 11a for the right eye, and "Lij" indicates a data of a pixel whose row and column are "i" and "j", respectively, in the input image data outputted from the image pickup device 11b for the left eye. Note that "R'ij" and "L'ij" indicate data of a pixel in the reduced image data that have gone through the image data reduction sections 23, respectively. This is because the reduction calculation causes each data of the pixels to be different from the input image data.

Figure 10:
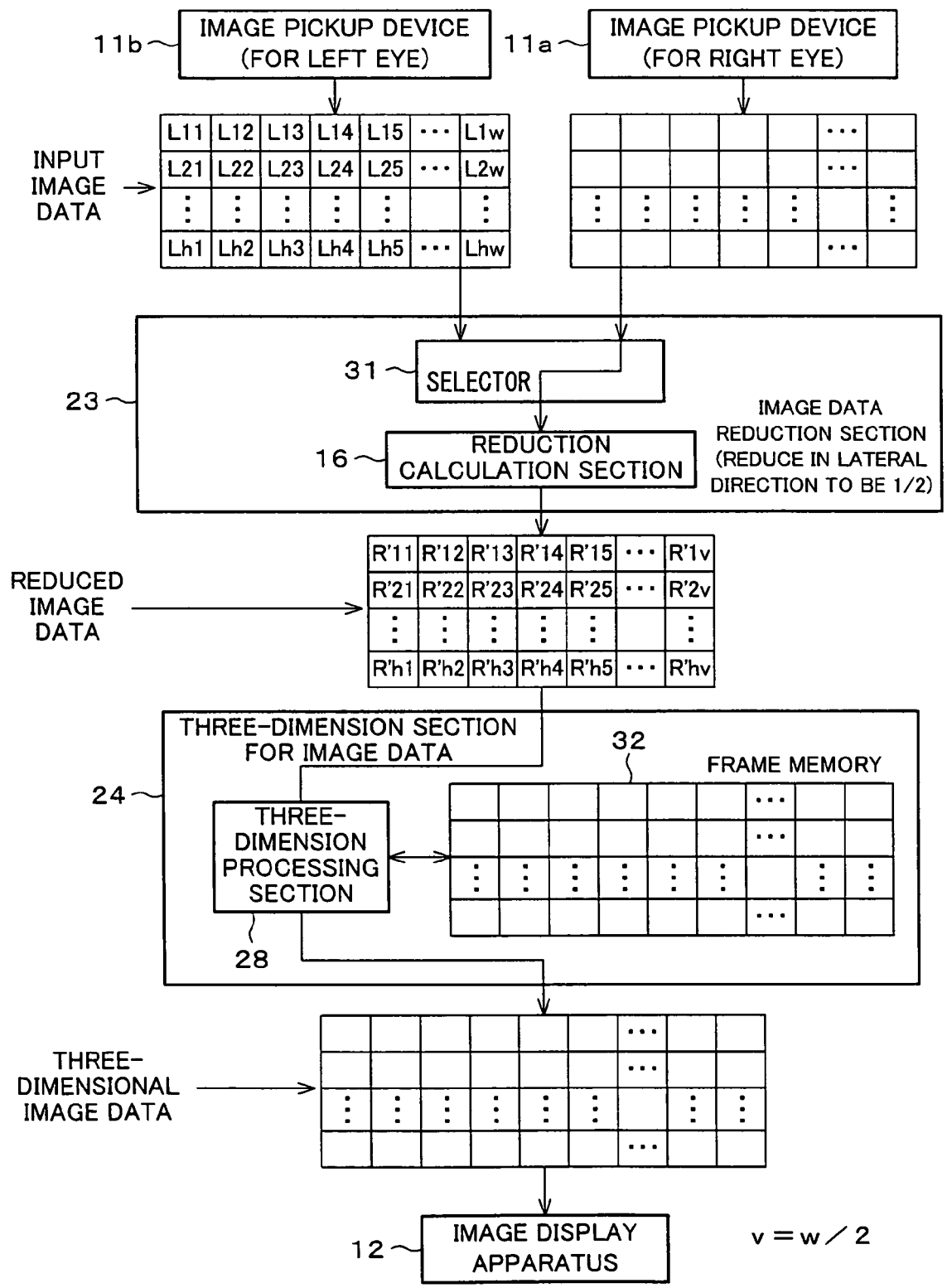
FIG. 10 is a block diagram showing how image data changes among blocks of the image pickup display system shown in FIG. 7 in the case where a three-dimensional image display is carried out by the image pickup display system, and especially is a block diagram showing that an input image data prepared by a pickup apparatus for the right eye is reduced the number by 50 percent merely in a lateral direction and outputted by a reduction calculation section.
Figure 11:
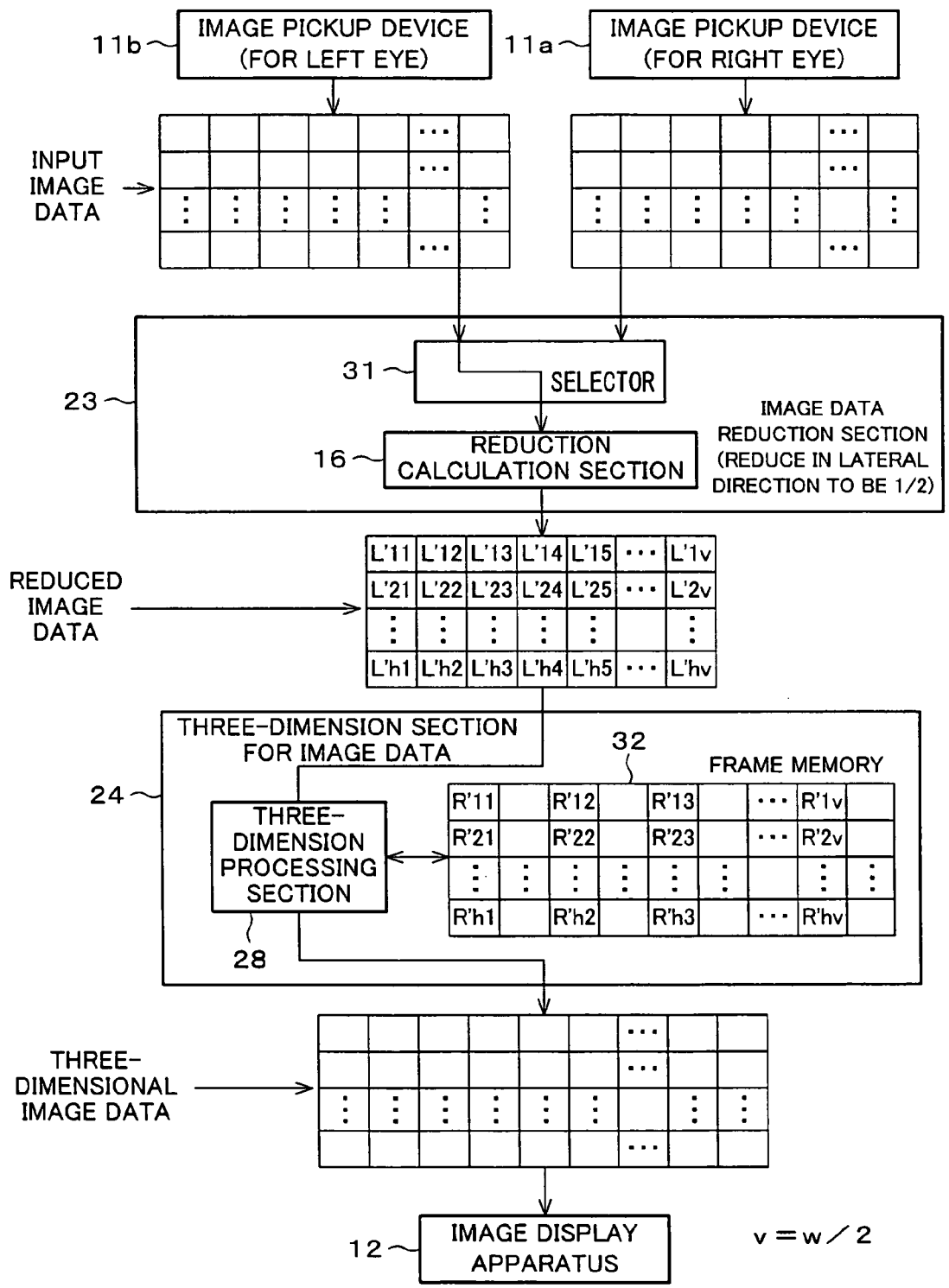
FIG. 11 is a block diagram showing how image data changes among blocks of the image pickup display system shown in FIG. 7 in the case where a three-dimensional image display is carried out by the image pickup display system, and especially is a block diagram showing that an input image data for the right eye that has been reduced the number of is stored in a frame memory and simultaneously an input image data for the left eye that has been prepared by a pickup apparatus is reduced the number by 50 percent merely in a lateral direction and outputted.
Figure 12:
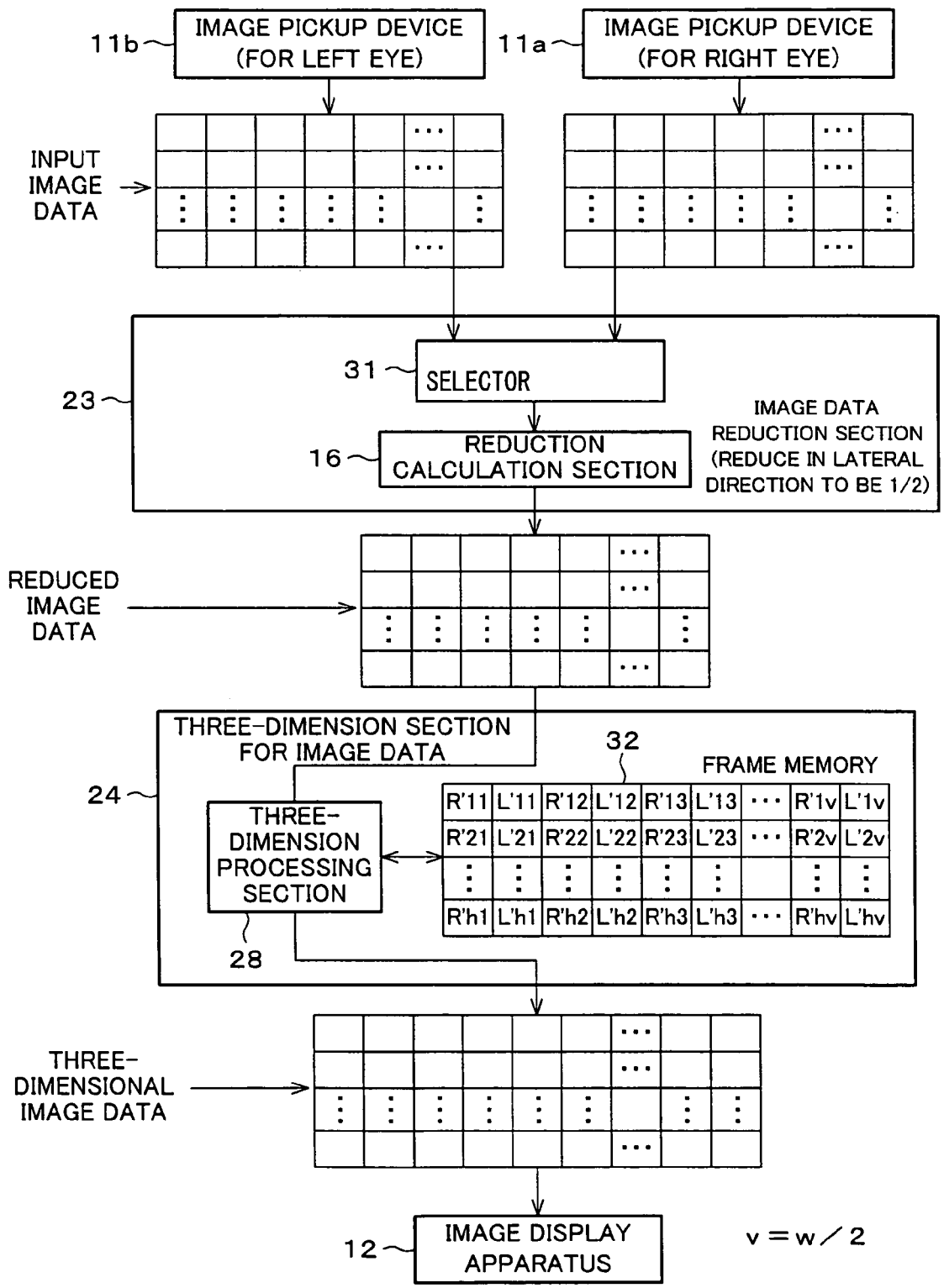
FIG. 12 is a block diagram showing how image data changes among blocks of the image pickup display system shown in FIG. 7 in the case where a three-dimensional image display is carried out by the image pickup display system, and especially is a block diagram showing that an input image data for the left eye that has been reduced the number of is stored in a frame memory and a thus finished three-dimensional image data is in the frame memory.
Figure 13:
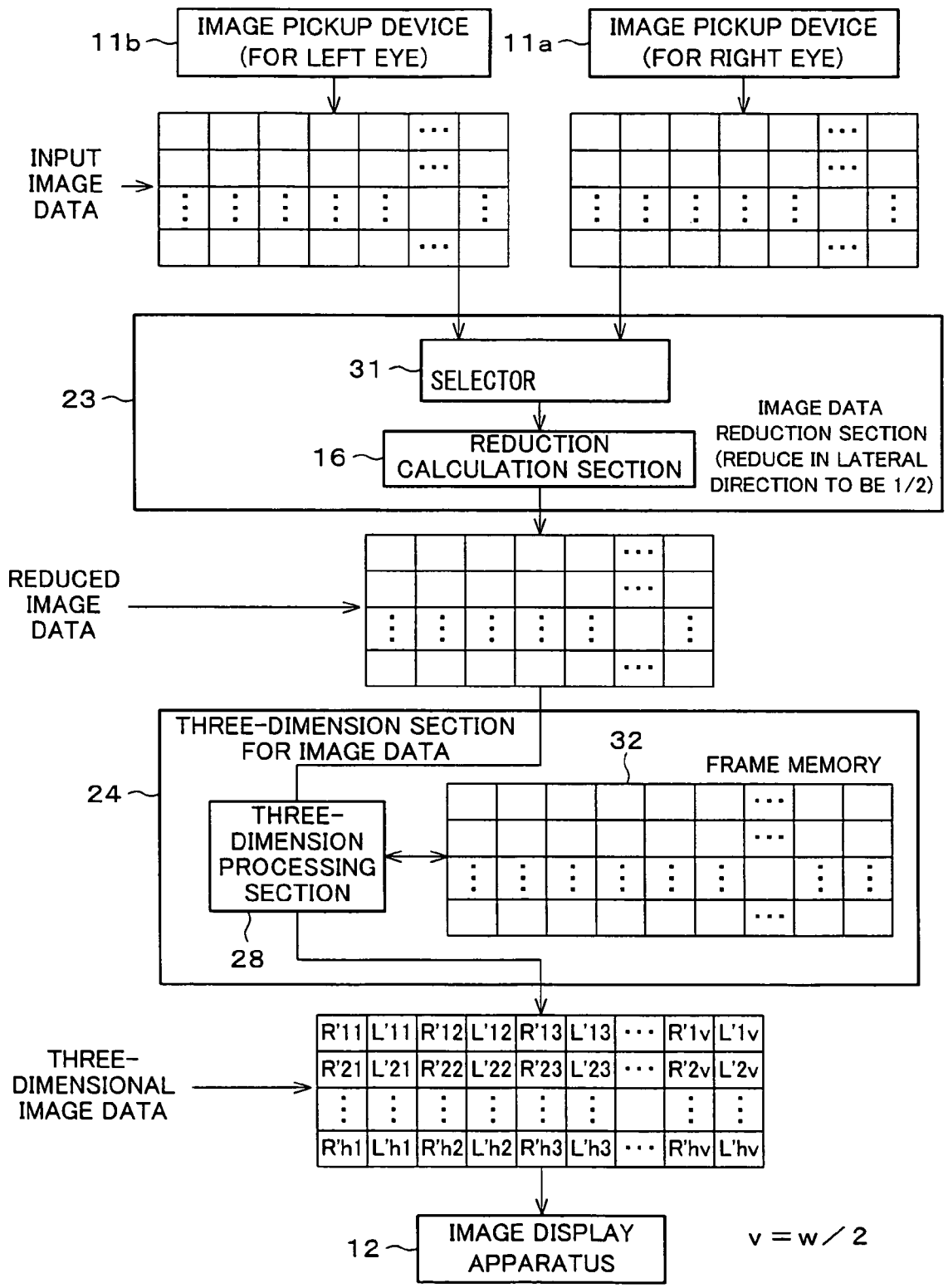
FIG. 13 is a block diagram showing how image data changes among blocks of the image pickup display system shown in FIG. 7 in the case where a three-dimensional image display is carried out by the image pickup display system, and especially is a block diagram showing that a three-dimensional image data stored in a frame memory is outputted to an image display apparatus.

Among input image data, having a resolution of (transversal w-line×longitudinal h-line), that have been picked up by respective image pickup devices 11a and 11b, the input image data of the image pickup device 11a is first selected by a selector 31 (see FIG. 9), and then is supplied to an image data reduction sections 23 such that a reduction calculation section 16 reduces the number of the respective input image data only in a lateral direction to be ½. The input image data thus become reduced image data each having a resolution of (transversal v(v=w/2)-line×longitudinal h-line), and are outputted to a three-dimension section 24 for image data via a selector 17 (not shown in FIG. 9), as shown in FIG. 10.

Secondly, the input image data from the image pickup device 11b is selected by the selector 31, and is supplied to the image data reduction sections 23, so as to be subject to the similar processing to the above one. The reduced image data thus processed is outputted from the image data reduction sections 23 (see FIG. 11).

The respective reduced image data are sequentially supplied to a three-dimension section 24 for image data, and are combined by a three-dimensional processing section 28 such that the columns of the respective reduced image data are alternately disposed and are stored in a frame memory 32. Thus, the respective reduced image data are converted into a three-dimensional image data so as to have a format better suited for an image display apparatus 12. Upon completion of thus storing all the reduced image data in the frame memory 32, the three-dimensional image data is finished up (see FIG. 12). The three-dimensional image data is outputted to the image display apparatus 12 via a selector 19, thereby allowing the image display apparatus 12 to carry out the three-dimensional image display (see FIG. 13).

In the present image processing apparatus 2a, the reduction calculation section 16 reduces the number of the image only in a lateral direction, not in a longitudinal direction. This ensures that the scale of the present calculation circuit is smaller than an ordinary reduction calculation circuit.

Figure 14:
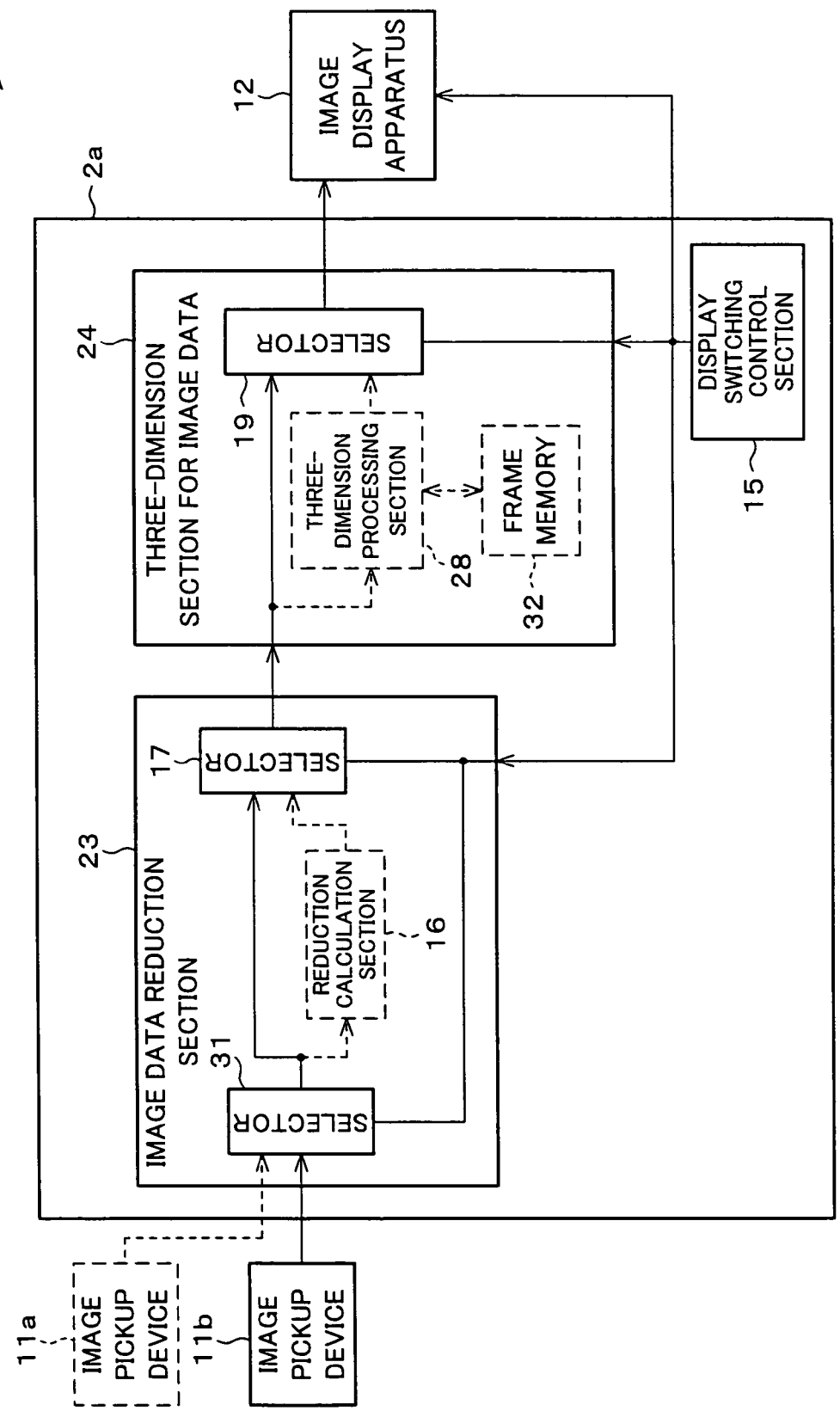
FIG. 14 is a block diagram showing how image data flows in the case of carrying out a two-dimensional image display in the image pickup display system shown in FIG. 7.

The following description deals with the flow of the image data in the case of carrying out a two-dimensional image display with reference to FIG. 14. Here, supposed is a case where the two-dimensional image display is carried out by the use of an input image data that has been picked up by an image pickup device 11b. Note that this is a mere example, i.e., the present invention is not limited to this case.

When carrying out the two-dimensional image display, the image data is proceeded with in accordance with solid lines shown in FIG. 14. This gives rise to the fact that the proceedings indicated by broken lines shown in FIG. 14 are not selected by selectors and that the blocks indicated by broken lines are not used.

When the input image data, having a resolution of (transversal w-line×longitudinal h-line), that has been picked up by an image pickup device 11b is supplied to an image data reduction section 23, the input image data is outputted to a three-dimension section 24 for image data via a selector 31 and a selector 17 while its resolution is kept unchanged. In the three-dimension section 24 for image data, the input image data from the image data reduction section 23 is outputted to an image display apparatus 12 via a selector 19 without going through a three-dimension processing section 28, such that the image display apparatus 12 carries out the two-dimensional image display.

In this case, the selector 31 does not select the input image data from an image pickup device 11a. The two-dimensional image display is carried out in accordance with the input image data from an image pickup device 11b, accordingly. When carrying out the two-dimensional image display of the image which the image pickup device 11a has picked up, it will be required that a display switching control section 15 controls the selections such that the input image data from the image pickup device 11a is selected by the selector 31. This ensures to carry out the two-dimensional image display of the image which arbitrary one of the two image pickup devices 11a and 11b has picked up.

According to the image processing apparatus 2a of the present embodiment, unlike that of the image processing apparatus 1a it is not necessary to provide a plurality of reduction calculation sections 16 each having a large circuit scale. Accordingly, it is possible to reduce the circuit scale and to reduce the cost and the power consumption of the image processing apparatus 2a.

Thus, the image pickup display apparatus 2 of the present embodiment includes (a) n image pickup devices 11, (b) an image data reduction section 23 that reduces the number of the respective image data which are picked up by the image pickup devices 11 to be 1/n in a lateral direction when carrying out the three-dimensional image display, whereas does not carry out any processing with respect to the image data when carrying out the two-dimensional image display, (c) a three-dimensional section 24 for image data for causing the image data from the respective image data reduction sections 23 to be a three-dimensional data by using a frame memory 32 and for supplying a succeeding circuit with the three-dimensional data when carrying out the three-dimensional image display, whereas supplying the succeeding circuit with only the image data from one of the image pickup devices 11, (d) an image display apparatus 12, having a same resolution as that of the image pickup devices 11, that can carry out the three-dimensional image display and the two-dimensional image display, and (e) a display switching control section 15 for controlling which one of the three-dimensional image display and the two-dimensional image display should be carried out.

According to the image pickup display system 2 of the present embodiment, the reduction calculation section 16 temporally switches the reduction calculations which the reduction calculation section 16 carries out for the plural input image data, so as to output the reduced image data corresponding to the respective input image data in a time-sharing manner. With the arrangement, the reduction calculations with respect to the respective input image data are carried out by the single reduction calculation section 16 in a time-sharing manner. Thus, it is not necessary to provide a plurality of reduction calculation sections 16 whose number is equal to the number of the input image data, thereby reducing the number of the reduction calculation sections 16.

Third Embodiment

Figure 15:
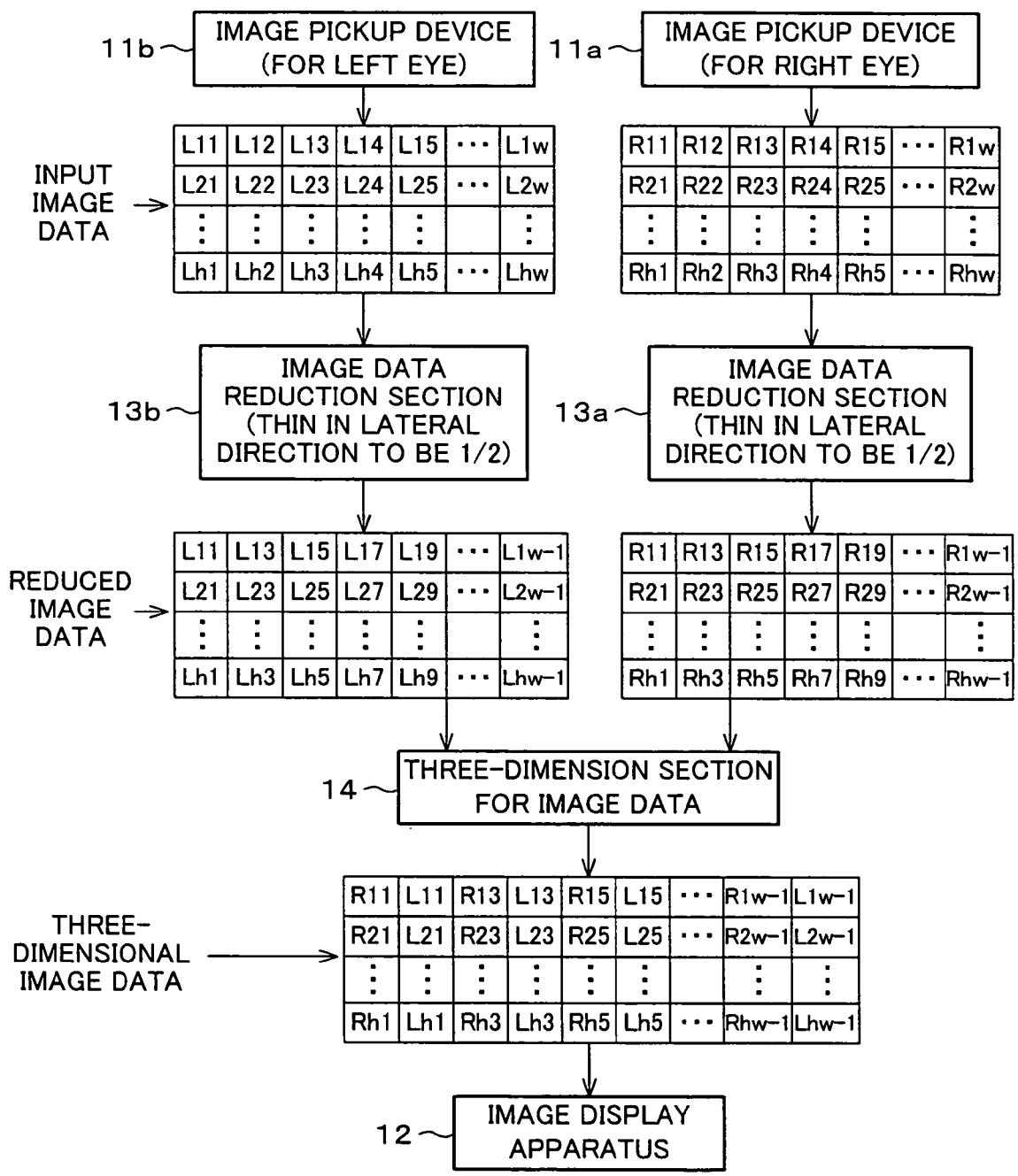
FIG. 15 is a block diagram showing how image data changes among blocks of an image pickup display system in an image data processing of a third embodiment in accordance with the present invention.

The following description deals with the third embodiment of the present invention with reference to FIG. 15.

The present embodiment deals with a case where a reduction calculation section 16 carries out an thinning calculation as an example of the reduction calculation. The arrangement of the first or second embodiment may be used as an arrangement of the present embodiment for carrying out the thinning calculation. Here, the following description will be made on the assumption that the present embodiment has the arrangement of the first embodiment.

FIG. 15 shows how the image data changes between image pickup device 11 and an image display apparatus 12, and corresponds to FIG. 5 of the first embodiment.

When input image data, having a resolution of (transversal w-line×longitudinal h-line), that have been picked up by respective image pickup devices 11a and 11b are supplied to image data reduction sections 13a and 13b, respectively, reduction calculation sections 16a and 16b reduce the number of the respective input image data in a lateral direction to be ½. The input image data thus become reduced image data each having a resolution of (transversal v(v=w/2)-line×longitudinal h-line), and are outputted to a three-dimension section 14 for image data via selectors 17a and 17b, respectively.

The reduction calculation sections 16a and 16b carry out a simplified data thinning as the reduction calculation. For example, by such a thinning, data, constituted only by odd-numbered column data, becomes a reduced image data. This gives rise to the fact that even-numbered data are not used for carrying out the three-dimensional image display.

The respective reduced image data are combined by a three-dimensional processing section 18 of the three-dimension section 14 such that the columns of the respective reduced image data are alternately disposed. Thus, the respective reduced image data are converted into a three-dimensional image data so as to have a format better suited for the image display apparatus 12. The three-dimensional image data thus converted is outputted to the image display apparatus 12 via the selector 19, thereby allowing the image display apparatus 12 to carry out the three-dimensional image display. Here, it is assumed that the image display apparatus 12 has a resolution of (transversal w-line×longitudinal h-line), and that the three-dimensional image data has a data size of (transversal w-line×longitudinal h-line).

Accordingly, the amount of reduction calculations is reduced, thereby realizing the image processing apparatus 1a whose circuit scale is small and whose power consumption is low.

Fourth Embodiment

Figure 16:
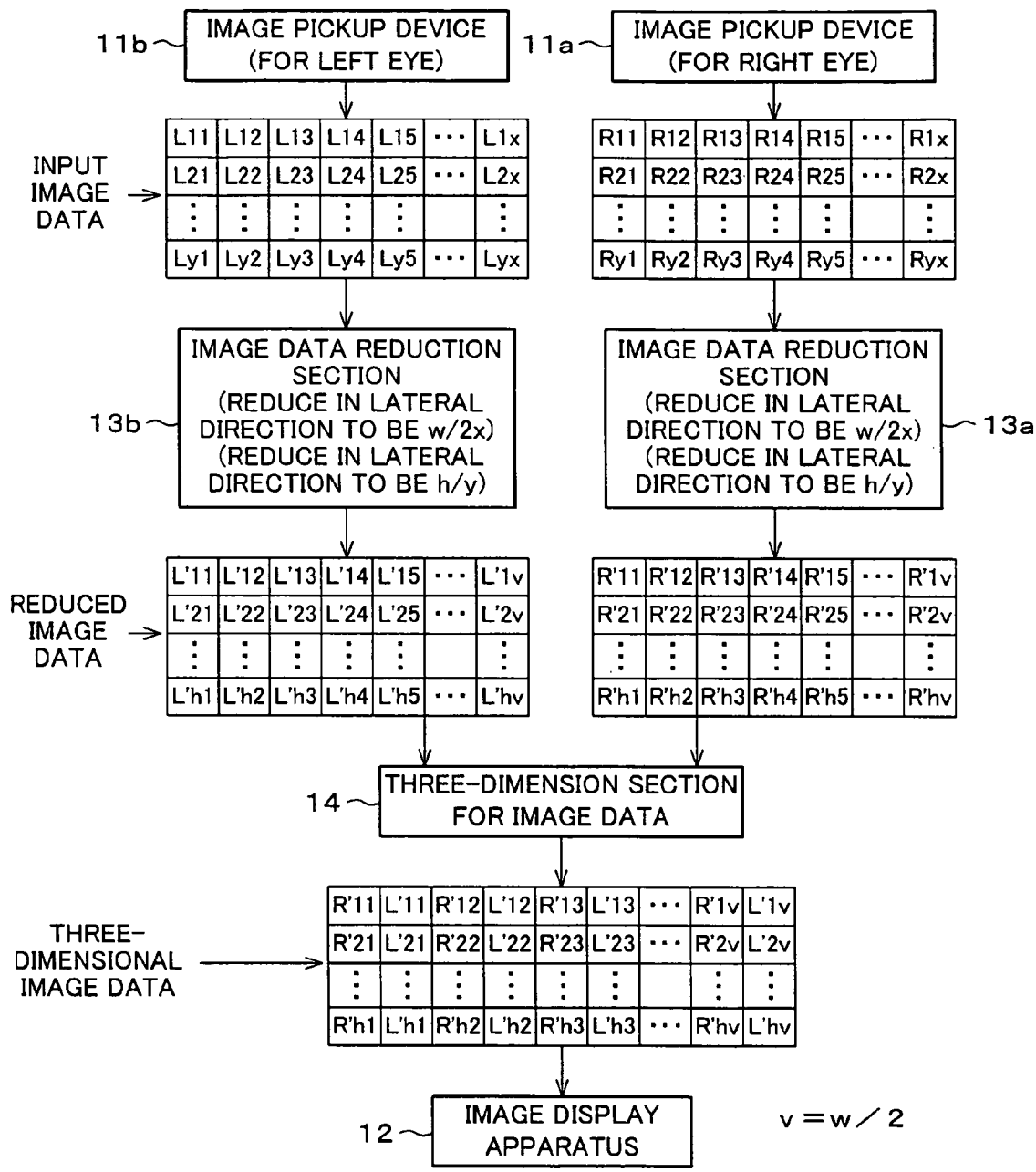
FIG. 16 is a block diagram showing how image data changes among blocks of an image pickup display system in an image data processing of a fourth embodiment in accordance with the present invention.

The following description deals with the fourth embodiment of the present invention with reference to FIG. 16.

The present embodiment differs from the first and second embodiments in that a reduction calculation section 16 can carry out the reduction calculations at arbitrary reduction rate in lateral and longitudinal directions, and in that image pickup device 11 has a higher resolution than that of (transversal w/n-line×longitudinal h-line) when an image display apparatus 12 has a resolution of (transversal w-line×longitudinal h-line). Here, "n" indicates the number of input image data used for carrying out a three-dimensional image display.

Note that the arrangement of the first or second embodiment may be used as an arrangement of the present embodiment for carrying out the calculation of the present embodiment. Here, the following description will be made on the assumption that the present embodiment has the arrangement of the first embodiment.

FIG. 16 shows how the image data changes between the image pickup device 11 and the image display apparatus 12, and corresponds to FIG. 5 of the first embodiment. Here, it is assumed that the image pickup devices 11a and 11b have a resolution of (transversal x-line×longitudinal y-line), and that the image display apparatus 12 has a resolution of (transversal w-line×longitudinal h-line).

When input image data, having a resolution of (transversal x-line×longitudinal y-line), that have been picked up by respective image pickup devices 11a and 11b are supplied to image data reduction sections 13a and 13b, respectively, reduction calculation sections 16a and 16b reduce the number of the input image data in a lateral direction to be w/(2x), whereas in a longitudinal direction to be h/y, respectively. The input image data thus become reduced image data each having a resolution of (transversal v(v=w/2)-line×longitudinal h-line), and are outputted to a three-dimension section 14 for image data via selectors 17a and 17b, respectively. The respective reduced image data are combined by a three-dimensional processing section 18 of the three-dimension section 14 such that the columns of the respective reduced image data are alternately disposed. Thus, the respective reduced image data are converted into a three-dimensional image data so as to have a format better suited for the image display apparatus 12. The three-dimensional image data thus converted is outputted to the image display apparatus 12 via the selector 19, thereby allowing the image display apparatus 12 to carry out the three-dimensional image display. Thus, the three-dimensional image data has a data size of (transversal w-line×longitudinal h-line).

As described above, according to the image processing apparatus 1a (a) the number of the input image data which are supplied to the image processing apparatus 1a is equal to n, (b) the image display apparatus 12 can carry out the three-dimensional image display of n-eye type which has a resolution of (transversal w-line×longitudinal h-line), and (c) the image pickup device 11 has a higher resolution than a resolution of (transversal w/n-line×longitudinal h-line).

The reason why the image pickup device 11 has a higher resolution than a resolution of (transversal w/n-line×longitudinal h-line) is that the resolution of the image pickup device 11 should be greater than the output resolution of the reduction calculation section 16.

According to the present embodiment, an image pickup display system can be realized with the use of the image pickup device 11 having a resolution that is different from that of the image display apparatus 12.

Fifth Embodiment

Figure 17:
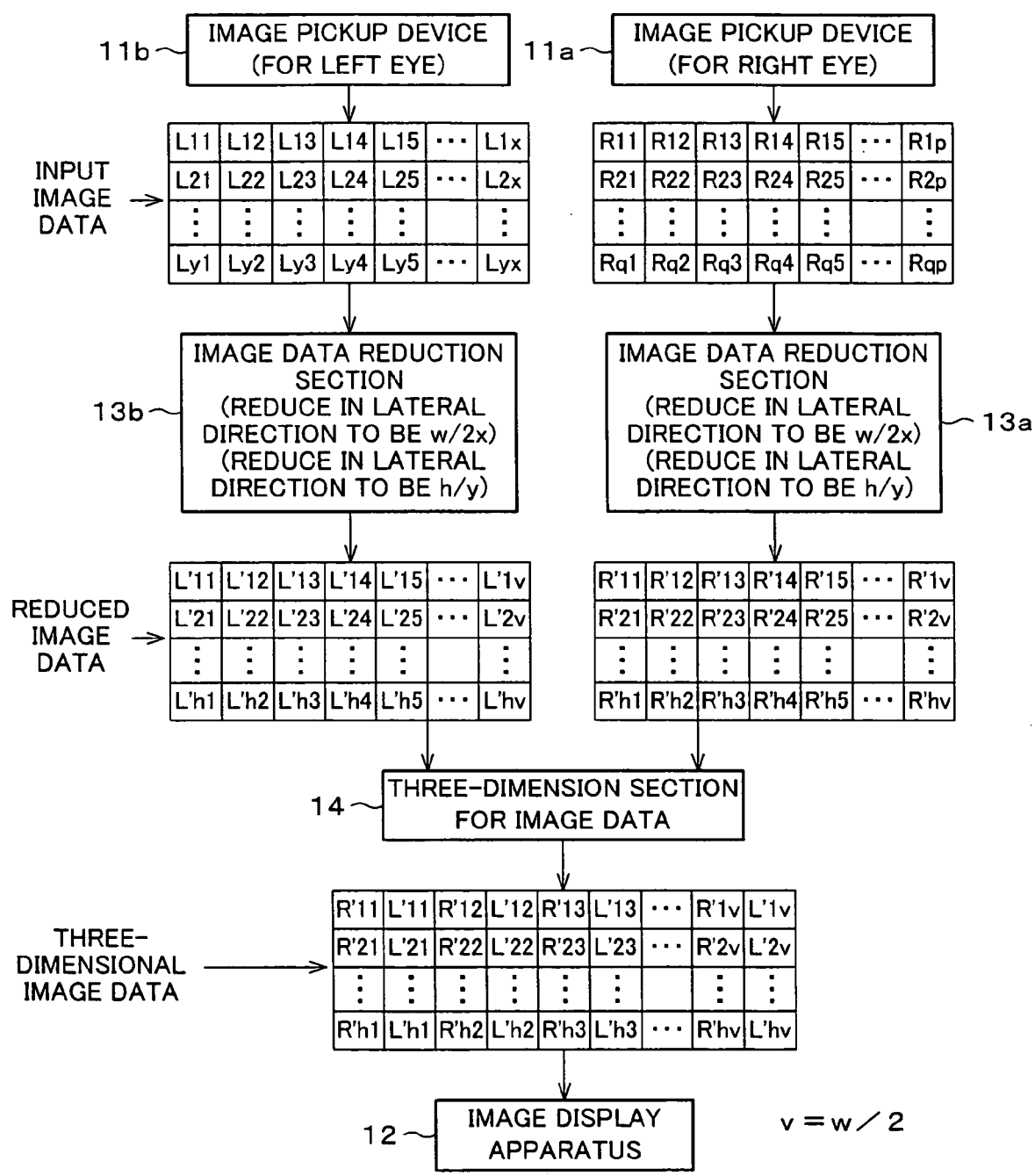
FIG. 17 is a block diagram showing how image data changes among blocks of an image pickup display system in an image data processing of a fifth embodiment in accordance with the present invention.

The following description deals with the fifth embodiment of the present invention with reference to FIG. 17.

The present embodiment has the same arrangement as the fourth embodiment except that an image pickup device 11a has a resolution that is different from that of an image pickup device 11b. Note that the arrangement of the first or second embodiment may be used as an arrangement of the present embodiment. Here, the following description will be made on the assumption that the present embodiment has the arrangement of the first embodiment.

FIG. 17 shows how the image data changes between the image pickup device 11 and the image display apparatus 12, and corresponds to FIG. 16 of the fourth embodiment. Here, it is assumed that (a) an image pickup device 11a has a resolution of (transversal p-line×longitudinal q-line), (b) an image pickup device 11b has a resolution of (transversal x-line×longitudinal y-line), and (c) the image display apparatus 12 has a resolution of (transversal w-line×longitudinal h-line).

When input image data, having a resolution of (transversal p-line×longitudinal q-line), that have been picked up by the image pickup device 11a is supplied to an image data reduction section 13a, a reduction calculation section 16a reduces the number of the input image data in a lateral direction to be w/(2p), whereas in a longitudinal direction to be h/q, respectively. The input image data thus become reduced image data each having a resolution of (transversal v(v=w/2)-line×longitudinal h-line), and are outputted to a three-dimension section 14 for image data via a selector 17a.

On the other hand, when input image data, having a resolution of (transversal x-line×longitudinal y-line), that have been picked up by the image pickup device 11b is supplied to an image data reduction section 13b, a reduction calculation section 16b reduces the number of the input image data in a lateral direction to be w/(2x), whereas in a longitudinal direction to be h/y, respectively. The input image data thus become reduced image data each having a resolution of (transversal v(v=w/2)-line×longitudinal h-line), and are outputted to a three-dimension section 14 for image data via a selector 17b.

The respective reduced image data are combined by a three-dimensional processing section 18 of the three-dimension section 14 such that the columns of the respective reduced image data are alternately disposed. Thus, the respective reduced image data are converted into a three-dimensional image data so as to have a format better suited for the image display apparatus 12. The three-dimensional image data thus converted is outputted to the image display apparatus 12 via the selector 19, thereby allowing the image display apparatus 12 to carry out the three-dimensional image display. Thus, the three-dimensional image data has a data size of (transversal w-line×longitudinal h-line).

Sixth Embodiment

Figure 18:
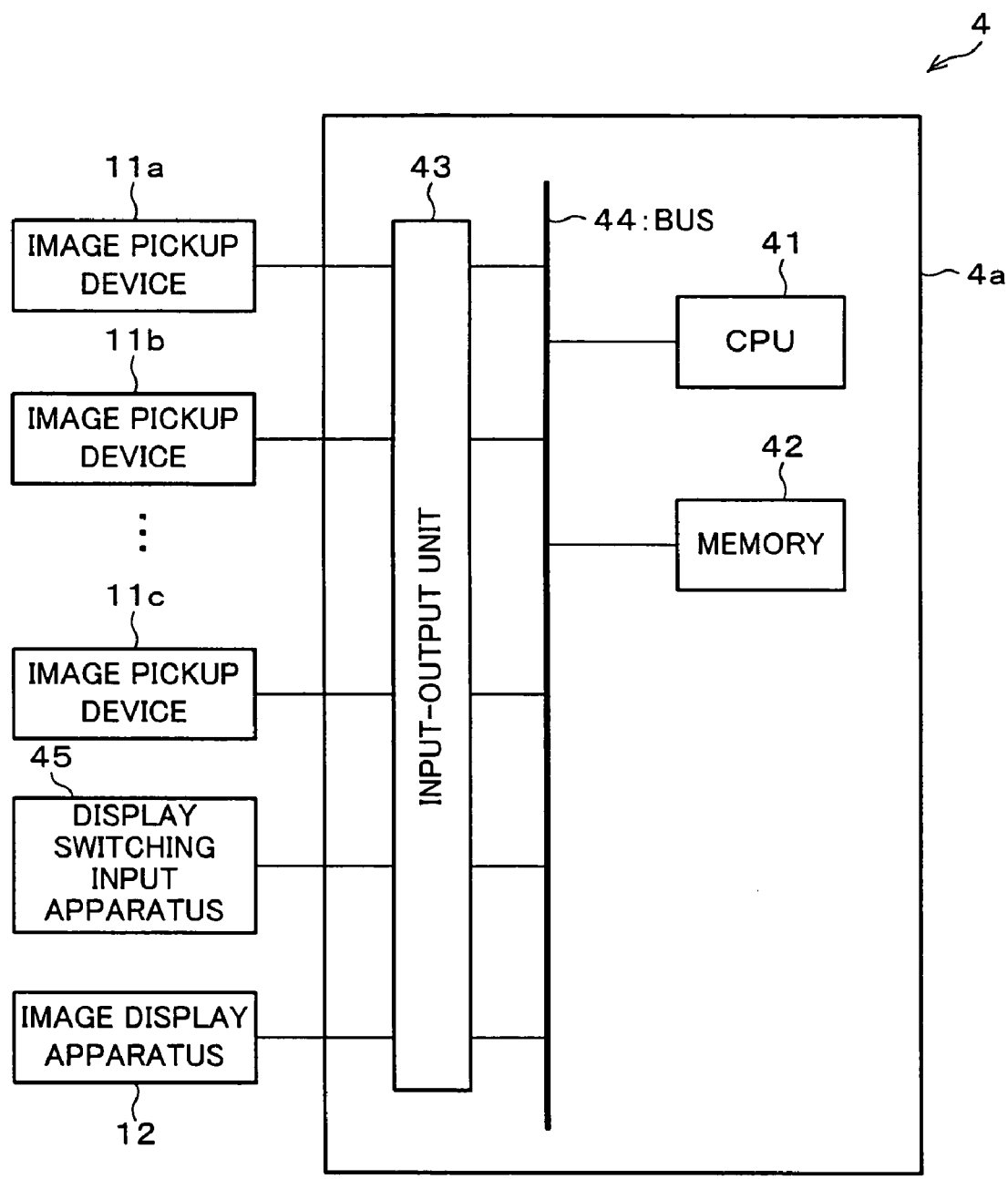
FIG. 18 is a block diagram showing a structure of an image pickup display system of a sixth embodiment in accordance with the present invention.

The following description deals with the sixth embodiment of the present invention with reference to FIG. 18.

The image processing apparatuses 1a and 2a in accordance with the foregoing first through fifth embodiments may be realized by hardware. Alternatively, they may be realized by an arrangement in which a computer reads an image processing program such that the computer operates as the image processing apparatuses 1a and 2a. The present embodiment adopts the latter realization. The following description deals with a hardware arrangement with reference to FIG. 18.

An image pickup display system 4 in accordance with the present embodiment includes image pickup devices 11a, 11b, and 11c, an image display apparatus 12, a display switching input apparatus 45, and an image processing apparatus 4a. Note that the image display apparatus 12 and the image pickup devices 11a, 11b, and 11c have the same reference numerals and functions as those of the first embodiment.

According to the present embodiment, the image processing apparatus 4a is constituted by a computer including a CPU (Central Processing Unit) 41, a memory 42, an input-output unit 43, and a bus 44.

In the image processing apparatus 4a, upon reading an image processing program, the CPU 41 carries out functions of the image data reduction section 13, the three-dimensional section 14 for image data, and the display switching control section 15 respectively shown in FIG. 1 or carries out functions of the image data reduction section 23, the three-dimensional section 24 for image data, and the display switching control section 15 respectively shown in FIG. 7. Note that the frame memory 32 shown in FIG. 2 is realized by the memory 42.

Note that inputting and/or outputting of various data are carried out via the input-output unit 43 between (a) external devices such as the image pickup devices 11, the image display apparatus 12, or the display switching input apparatus 45 and (b) devices in the image processing apparatus 4a such as the CPU 41 or the memory 42. Transmitting and receiving of data are carried out via the bus 44 between the CPU 41 and the memory 42 as well as between the CPU 41 and the input-output unit 43. An ordinary computer is provided with these devices as constituent components.

The display switching input apparatus 45 provides the display switching control section 15 with instructions on switching of two-dimensional image display and three-dimensional image display, in response to the operation of a user.

In the image processing apparatus 4a, when carrying out the three-dimensional image display, the input image data are read out from the image pickup devices 11a, 11b, and 11c by the CPU 41 via the input-output unit 43 and the bus 44. The CPU 41 reduces the number of the image and converts the image into a three-dimension data with the use of the memory 42, so as to prepare a three-dimensional image data. The three-dimensional image data thus prepared is sent to the image display apparatus 12 via the bus 44 and the input-output unit 43.

In the image processing apparatus 4a, when carrying out the two-dimensional image display, the input image data are read out from the image pickup devices 11a 11b, and 11c by the CPU 41 via the input-output unit 43 and the bus 44. The CPU 41 reduces the number of the image with the use of the memory 42 as the need arises so as to prepare a two-dimensional image data. The two-dimensional image data thus prepared is sent to the image display apparatus 12 via the bus 44 and the input-output unit 43.

The CPU 41 judges in response to the display switching input apparatus 45 whether the two-dimensional image display or the three-dimensional image display should be carried out.

Note that the image processing program may be supplied to the image processing apparatus 4a from a recording medium in which the image processing program is recorded. Alternatively, the image processing program may be supplied to the image processing apparatus 4a via telecommunications networks, provided that the image processing apparatus 4a and the telecommunications networks including Internet and intranet are arranged so as to be linkable with each other.

The recording medium in which the image processing program is recorded may be detachably provided with respect to the image processing apparatus 4a. Alternatively, the recording medium may be built in the image processing apparatus 4a. The recording medium may be loaded with respect to the image processing apparatus 4a so that the computer directly reads out the program codes that have been recorded in the recording medium. Alternatively, the recording medium may be loaded with respect to a program reader, functioning as an external memory apparatus, connected to the image processing apparatus 4a so that the computer reads out the program codes via the program reader.

For example, the following are used as the recording medium: a tape medium such as a magnetic tape or a cassette tape, a disk medium including a magnetic disk such as a flexible disk or hard disk and an optical disk such as CD-ROM, MO, DVD, or CD-R, a card medium such as an IC card including a memory card or an optical card, or semiconductor memory medium such as a mask ROM, EPROM, EEPROM, or a flash ROM.

The program codes may be supplied to the image processing apparatus 4a via telecommunications networks. The telecommunications networks are not limited to specific ones. One of them may be selected at the discretion of a user. The transmission medium constituting the telecommunications networks is not limited to a specific one. A user can select it at his or her discretion. Further, the present invention may be realized in the form of signal carrier or sequence of data signal that are realized by electronically transmitting the program codes.

As described in the first through sixth embodiments, an image processing apparatus (image processing apparatuses 1a, 2a, and 4a) in accordance with the present invention includes: reduction calculation means (reduction calculation section 16, and reduction calculation sections 16a, 16b, and 16c) for reducing the number of a plurality of input image data, corresponding to a plurality of images that satisfy azimuth difference relations each other, in a lateral direction; three-dimensional processing means (three-dimensional processing sections 18 and 28) for combining the image data that have been reduced the number by the reduction calculation means so as to prepare a three-dimensional image data; and switching means (display switching control section 15) for switching and selecting which one of three-dimensional image data prepared by the three-dimensional processing means and two-dimensional image data prepared by using one of the plurality of input image data should be outputted.

According to the image processing apparatus having the above arrangement, a plurality of images that satisfy azimuth difference relations each other are picked up with the use of a plurality of ordinary image pickup devices 11, and input image data from the image pickup devices 11 are supplied, thereby ensuring that a three-dimensional image data for three-dimensional image display and a two-dimensional image data for two-dimensional image display are switched and outputted to an image display apparatus 12.

More specifically, when carrying out the three-dimensional image display, the reduction calculation means reduces the number of the respective input image data in a lateral direction so as to prepare the plural reduced image data. The plural reduced image data are combined by the three-dimensional processing means, so as to prepare the three-dimensional image data. On the other hand, when carrying out the two-dimensional image display, it is possible to prepare the two-dimensional image data by using one of the plurality of input image data. The switching means can switch and select which one of the two-dimensional image data and the three-dimensional image data should be outputted.

Thus, it is possible to realize the two-dimensional image display and the three-dimensional image display with the use of a single device arrangement. For example, in response to user's instruction on switching of displays, it is possible to switch the two-dimensional image display and the three-dimensional image display, and to select one of them, with ease.

Note that an image pickup system in accordance with the present invention includes: the image processing apparatus; and pickup means (image pickup devices 11a, 11b, and 11c) for causing the image processing apparatus to receive the plural input image data that obtained by picking up the plural images that satisfy the azimuth difference relations each other. An image display system in accordance with the present invention includes: the above image processing apparatus; and display means (image display apparatus 12) for carrying out the three-dimensional image display and the two-dimensional image display in accordance with the three-dimensional image data and the two-dimensional image that are outputted from the image processing apparatus, respectively.

The present invention is not limited to the respective embodiments. The present invention may be modified in many ways within a range recited in claims. The technical scope of the present invention also includes an embodiment obtained by appropriately combining the technical means disclosed in the above-described different embodiments.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus, comprising:
reduction calculation means for reducing the number of a plurality of input image data, corresponding to a plurality of images that satisfy azimuth difference relations each other, in a lateral direction, respectively;
three-dimensional processing means for combining the image data that have been reduced the number by the reduction calculation means so as to prepare a three-dimensional image data; and
switching means for switching and selecting which one of three-dimensional image data prepared by the three-dimensional processing means and two-dimensional image data prepared by using one of the plurality of input image data should be outputted.

2. The image processing apparatus as set forth in claim 1, wherein said reduction calculation means are provided as many as the input image data.

3. The image processing apparatus as set forth in claim 2, further comprising:
first selectors, each for selecting and outputting either one of the input image data to be supplied to said reduction calculation means and the reduced image data from the reduction calculation means, said first selectors being provided in association with and as many as said reduction calculation means, and provided between said reduction calculation means and said three-dimensional processing means; and
a second selector, provided at respective subsequent stages of said first selectors and said three-dimensional processing means, for selecting and outputting either one of the three-dimensional image data from said three-dimensional processing means and the input image data from said respective first selectors,
said switching means controlling how the first and second selectors should select.

4. The image processing apparatus as set forth in claim 1, wherein said reduction calculation means temporally switches the plurality of input image data and reduces the number of the input image data thus switched, respectively, so as to output the respective reduced image data in a time-sharing manner.

5. The image processing apparatus as set forth in claim 4, further comprising:

a third selector, provided between said reduction calculation means and said three-dimensional processing means, for selecting and outputting either one of the input image data to be supplied to said reduction calculation means and the reduced image data from said reduction calculation means; and
a fourth selector, provided so as to be followed by said reduction calculation means and by said third selector, for sequentially switching the plurality of input image data, and for outputting the input image data thus switched to said reduction calculation means and said third selector, respectively, and
a fifth selector, provided at respective subsequent stages of said third selector and said three-dimensional processing means, for selecting and outputting either one of the three-dimensional image data from said three-dimensional processing means and the input image data from said third selector,
said switching means controlling how the third through fifth selectors should select.

6. The image processing apparatus as set forth in claim 4, further comprising:
a frame memory in which said three-dimensional processing means stores image data so as to combine the reduced image data.

7. The image processing apparatus as set forth in claim 1, wherein said reduction calculation means carries out a thinning with respect to the input image data so as to reduce the number of the input image data.

8. The image processing apparatus as set forth in claim 1, wherein there are at least n of the input image data, and n is an integer of not less than 2, and
said three-dimensional processing means combines the reduced image data corresponding to m, where m is an integer of not less than 2 but less than n, input image data among the n input image data so as to prepare The three-dimensional image data.

9. An image pickup system, comprising:
an image processing apparatus as set forth in claim 1; and
pickup means for picking up the plurality of images that satisfy azimuth difference relations each other so as to obtain the plurality of input image data, and for supplying said image processing apparatus with the plurality of input image data.

10. An image display system, comprising:
an image processing apparatus as set forth in claim 1; and
display means for carrying out three-dimensional image display and two-dimensional image display in response to the three-dimensional image data and the two-dimensional image data that are outputted from said image processing apparatus, respectively.

11. The image display system as set forth in claim 10, wherein said display means is a three-dimensional image display apparatus of parallax barrier type.

12. The image display system as set forth in claim 10, wherein said display means is a three-dimensional image display apparatus of lenticular lens type.

13. An image pickup display system, comprising:
an image processing apparatus as set forth in claim 1;
pickup means for picking up the plurality of images that satisfy azimuth difference relations each other so as to obtain the plurality of input image data, and for supplying said image processing apparatus with the plurality of input image data; and
display means for carrying out three-dimensional image display and two-dimensional image display in response to the three-dimensional image data and the two-dimensional image data that are outputted from said image processing apparatus, respectively.

14. The image pickup display system as set forth in claim 13, wherein:
- at least n of the input image data are supplied to said pickup means, where n is an integer of not less than 2,
- said display means can carry out the three-dimensional image display of n-eye type that has a resolution of w×h, where w represents the traversal direction of display and h represents the longitudinal direction of display, where each of w and h is a positive integer, and
- said pickup means has a higher resolution than a resolution of w/n×h, where w/n represents the traversal direction of display and h represents the longitudinal direction of display.

15. The image pickup display system as set forth in claim 14, wherein said pickup means has different resolutions for the respective input image data.

16. A computer-readable recording medium, storing instructions, executed by a processor, to cause a computer to function as said respective means of the image processing apparatus recited in claim 1.

17. A sequence of data signal realized by an electronic transmission of an image processing program causing a computer to function as said respective means of said image processing apparatus as set forth in claim 1.

* * * * *